(12) United States Patent
Roskind et al.

(10) Patent No.: US 11,303,946 B2
(45) Date of Patent: Apr. 12, 2022

(54) METHOD AND DEVICE FOR SYNCHRONIZING DATA

(71) Applicant: HUAWEI TECHNOLOGIES CO., LTD., Guangdong (CN)

(72) Inventors: James A. Roskind, Redwood City, CA (US); Aaron T. Emigh, Incline Village, NV (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/178,767

(22) Filed: Jun. 10, 2016

(65) Prior Publication Data

US 2016/0286253 A1    Sep. 29, 2016

Related U.S. Application Data

(63) Continuation of application No. 13/685,600, filed on Nov. 26, 2012, now Pat. No. 9,386,404, which is a
(Continued)

(51) Int. Cl.
*G06F 15/173* (2006.01)
*H04N 21/242* (2011.01)
(Continued)

(52) U.S. Cl.
CPC ....... *H04N 21/242* (2013.01); *H04L 12/4604* (2013.01); *H04L 67/306* (2013.01);
(Continued)

(58) Field of Classification Search
CPC .............................................. H04N 21/25808
See application file for complete search history.

(56) References Cited

U.S. PATENT DOCUMENTS

| 5,642,171 A | 6/1997 | Baumgartner et al. |
| 5,690,496 A | 11/1997 | Kennedy |

(Continued)

OTHER PUBLICATIONS

Naveed U. Qazi et al.,"A Synchronization and Communication Model for Distributed Multimedia Objects", 1993,ACM Proceedings of the first ACM international conference on multimedia, total 16 pages.
(Continued)

*Primary Examiner* — Guang W Li
(74) *Attorney, Agent, or Firm* — Leydig, Voit & Mayer, Ltd.

(57) ABSTRACT

In some embodiments a system is provided, comprising a playback device, configured to play a piece of multimedia content, stop playing the piece of multimedia content, wherein the playing of the piece of multimedia content is stopped at a first point, connect to a server, and synchronize information relating to the first point to the server; the server, configured to save the information relating to the first point in a profile associated with an individual user, connect to a recipient device, and synchronize the information relating to the first point to a recipient device; the recipient device, configured to play the piece of multimedia content, wherein playing the piece of multimedia content on the recipient device starts from a second point related to the first point at which the playing of the piece of multimedia content on the playback device is stopped.

20 Claims, 30 Drawing Sheets

Related U.S. Application Data continuation of application No. 10/967,553, filed on Oct. 15, 2004, now Pat. No. 8,321,534.

(60) Provisional application No. 60/588,017, filed on Jul. 13, 2004, provisional application No. 60/511,821, filed on Oct. 15, 2003.

(51) Int. Cl.
  *H04N 21/258*    (2011.01)
  *H04N 21/658*    (2011.01)
  *H04N 21/6587*    (2011.01)
  *H04L 12/46*    (2006.01)
  *H04L 67/306*    (2022.01)
  *H04N 21/2387*    (2011.01)
  *H04N 21/61*    (2011.01)

(52) U.S. Cl.
  CPC ... *H04N 21/2387* (2013.01); *H04N 21/25808* (2013.01); *H04N 21/25891* (2013.01); *H04N 21/6125* (2013.01); *H04N 21/6582* (2013.01); *H04N 21/6587* (2013.01)

(56) References Cited

U.S. PATENT DOCUMENTS

| | | | |
|---|---|---|---|
| 5,742,820 A | 4/1998 | Perlman et al. | |
| 5,953,005 A | 9/1999 | Liu | |
| 6,170,005 B1 | 1/2001 | Meandzija | |
| 6,240,105 B1 | 5/2001 | Zetts | |
| 6,370,688 B1 | 4/2002 | Hejna, Jr. | |
| 6,378,129 B1 | 4/2002 | Zetts | |
| 6,397,249 B1 | 5/2002 | Cromer et al. | |
| 6,543,053 B1 | 4/2003 | Li et al. | |
| 6,549,917 B1 * | 4/2003 | Pollard | H04L 67/06 |
| 6,601,076 B1 | 7/2003 | McCaw et al. | |
| 6,631,410 B1 | 10/2003 | Kowalski et al. | |
| 6,636,237 B1 | 10/2003 | Murray et al. | |
| 6,741,853 B1 | 5/2004 | Jiang et al. | |
| 6,775,276 B1 | 8/2004 | Beser | |
| 6,806,813 B1 | 10/2004 | Cheng et al. | |
| 6,868,225 B1 * | 3/2005 | Brown | G11B 27/034 |
| | | | 348/E7.061 |
| 6,868,440 B1 | 3/2005 | Gupta et al. | |
| 6,892,210 B1 | 5/2005 | Erickson et al. | |
| 6,957,276 B1 | 10/2005 | Bahl | |
| 6,968,364 B1 | 11/2005 | Wong et al. | |
| 7,092,943 B2 | 8/2006 | Roese et al. | |
| 7,103,906 B1 * | 9/2006 | Katz | H04N 7/17318 |
| | | | 725/87 |
| 7,136,934 B2 | 11/2006 | Carter et al. | |
| 7,206,367 B1 | 4/2007 | Moore | |
| 7,269,338 B2 | 9/2007 | Janevski | |
| 7,287,097 B1 | 10/2007 | Friend et al. | |
| 7,320,137 B1 * | 1/2008 | Novak | G11B 27/34 |
| | | | 348/E7.071 |
| 7,330,112 B1 | 2/2008 | Emigh et al. | |
| 7,451,453 B1 | 11/2008 | Evans et al. | |
| 7,509,667 B1 | 3/2009 | Cook | |
| 7,536,707 B2 * | 5/2009 | Matsumoto | H04N 5/76 |
| | | | 348/14.01 |
| 7,596,570 B1 | 9/2009 | Emigh et al. | |
| 7,624,337 B2 * | 11/2009 | Sull | G06F 17/30796 |
| | | | 715/201 |
| 7,636,705 B2 * | 12/2009 | Kim | G11B 27/11 |
| 7,680,902 B2 | 3/2010 | Roberts et al. | |
| 8,069,162 B1 | 11/2011 | Emigh et al. | |
| 8,191,138 B1 | 5/2012 | Emigh et al. | |
| 8,417,827 B2 * | 4/2013 | Anttila | H04L 29/06 |
| | | | 709/217 |
| 8,942,549 B2 * | 1/2015 | Duffin | G11B 27/322 |
| | | | 386/349 |
| 9,161,087 B2 * | 10/2015 | Katz | H04N 7/17318 |
| 9,956,490 B2 * | 5/2018 | Perlman | A63F 13/12 |
| 2001/0047407 A1 | 11/2001 | Moore et al. | |
| 2002/0010917 A1 * | 1/2002 | Srikantan | H04N 21/4363 |
| | | | 725/1 |
| 2002/0013844 A1 | 1/2002 | Garrett et al. | |
| 2002/0046296 A1 | 4/2002 | Kloba et al. | |
| 2002/0059621 A1 * | 5/2002 | Thomas | G06F 3/0481 |
| | | | 725/87 |
| 2002/0065926 A1 | 5/2002 | Hackney et al. | |
| 2002/0078220 A1 | 6/2002 | Ryan | |
| 2002/0098840 A1 | 7/2002 | Hanson et al. | |
| 2002/0112244 A1 | 8/2002 | Liou et al. | |
| 2002/0112247 A1 | 8/2002 | Horner et al. | |
| 2002/0116477 A1 | 8/2002 | Somashekar et al. | |
| 2002/0161797 A1 * | 10/2002 | Gallo | G06F 16/9577 |
| | | | 715/203 |
| 2002/0188842 A1 | 12/2002 | Willeby | |
| 2002/0194309 A1 * | 12/2002 | Carter | H04L 29/06027 |
| | | | 709/219 |
| 2003/0005161 A1 * | 1/2003 | Chen | G06F 16/27 |
| | | | 709/248 |
| 2003/0079038 A1 | 4/2003 | Robbin et al. | |
| 2003/0095520 A1 | 5/2003 | Aalbers et al. | |
| 2003/0095791 A1 * | 5/2003 | Barton | H04N 5/765 |
| | | | 386/230 |
| 2003/0130984 A1 | 7/2003 | Quinlan et al. | |
| 2003/0133450 A1 | 7/2003 | Baum | |
| 2003/0145099 A1 * | 7/2003 | Oka | H04N 5/76 |
| | | | 709/232 |
| 2003/0172290 A1 | 9/2003 | Newcombe et al. | |
| 2003/0200311 A1 | 10/2003 | Baum | |
| 2003/0217096 A1 * | 11/2003 | McKelvie | H04L 51/04 |
| | | | 709/202 |
| 2003/0225777 A1 | 12/2003 | Marsh | |
| 2003/0229900 A1 * | 12/2003 | Reisman | H04N 21/42204 |
| | | | 725/87 |
| 2004/0064559 A1 | 4/2004 | Kupst et al. | |
| 2004/0075678 A1 | 4/2004 | Kazui et al. | |
| 2004/0078489 A1 | 4/2004 | Anderson et al. | |
| 2004/0088728 A1 * | 5/2004 | Shimizu | H04N 21/4622 |
| | | | 725/89 |
| 2004/0103444 A1 * | 5/2004 | Weinberg | H04N 21/242 |
| | | | 725/132 |
| 2004/0111640 A1 | 6/2004 | Baum | |
| 2004/0117836 A1 * | 6/2004 | Karaoguz | H04N 21/2343 |
| | | | 725/81 |
| 2004/0220926 A1 | 11/2004 | Lamkin et al. | |
| 2004/0221304 A1 | 11/2004 | Sparrell et al. | |
| 2004/0242224 A1 | 12/2004 | Janik et al. | |
| 2004/0252400 A1 | 12/2004 | Blank et al. | |
| 2004/0267952 A1 | 12/2004 | He et al. | |
| 2005/0055575 A1 | 3/2005 | Evans et al. | |
| 2005/0097623 A1 * | 5/2005 | Tecot | G11B 27/10 |
| | | | 725/136 |
| 2005/0108431 A1 | 5/2005 | Park | |
| 2005/0114507 A1 | 5/2005 | Tarui et al. | |
| 2005/0125550 A1 | 6/2005 | Bajikar | |
| 2005/0166258 A1 * | 7/2005 | Vasilevsky | G11B 27/00 |
| | | | 725/138 |
| 2005/0253722 A1 | 11/2005 | Droms et al. | |
| 2005/0289236 A1 * | 12/2005 | Hull | H04L 67/18 |
| | | | 709/231 |
| 2006/0161635 A1 | 7/2006 | Lamkin et al. | |
| 2006/0268782 A1 | 11/2006 | Kwak et al. | |
| 2006/0279628 A1 * | 12/2006 | Fleming | G11B 27/034 |
| | | | 348/143 |
| 2007/0266122 A1 | 11/2007 | Einarsson et al. | |
| 2012/0047166 A1 * | 2/2012 | Katz | H04N 7/17318 |
| | | | 707/769 |

(56) References Cited

U.S. PATENT DOCUMENTS

2012/0149476 A1\* 6/2012 Perlman .................. A63F 13/12
463/42

OTHER PUBLICATIONS

Thomas Meyer et al.,"A taxonomy on multimedia synchronization",Sep. 22-24, 1993, Proceedings of the 4th Workshop on Future Trends of Distributed Computing Systems, total 7 pages.

\* cited by examiner

METHOD AND DEVICE FOR SYNCHRONIZING DATA

CROSS-REFERENCE TO RELATED APPLICATIONS

This application is a continuation of U.S. patent application Ser. No. 13/685,600, filed on Nov. 26, 2012, now allowed, which is a continuation of U.S. patent application Ser. No. 10/967,553, filed on Oct. 15, 2004, now U.S. Pat. No. 8,321,534, which claims priority to U.S. Provisional Patent Application No. 60/511,821, filed on Oct. 15, 2003, and also claims priority to U.S. Provisional Patent Application No. 60/588,017, filed on Jul. 13, 2004, each of which is incorporated herein by reference in their entireties for all purposes.

TECHNICAL FIELD

The present invention relates to a system and method for synchronizing data.

BACKGROUND

An increasing volume of data creates additional need for synchronization. However, data synchronization currently lacks functionality and is cumbersome to use.

It would be useful to have improved functionality and ease of use for data synchronization.

BRIEF DESCRIPTION OF DRAWINGS

The invention claimed and/or described herein is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 4($b$) is a flowchart of an exemplary process, in which a data device synchronizes data with a source data device, according to some embodiments;

FIG. 4($c$) is a flowchart of an exemplary process, in which a data device synchronizes data with a recipient data device, according to some embodiments;

FIG. 4($d$) is a flowchart of an exemplary process, in which a data device synchronizes data with a recipient data device upon request, according to some embodiments;

FIG. 8($b$) is a flowchart of an exemplary process to detect locality based on broadcast information, according to some embodiments;

FIG. 8($c$) is a flowchart of an exemplary process to automatically estimate locality based on location information from a device, according to some embodiments;

FIG. 8($d$) is a flowchart of an exemplary method for providing location information in broadcast information, according to some embodiments.

FIG. 8($e$) is a flowchart of an exemplary method for providing a location service, according to some embodiments.

FIG. 20($b$) is a flowchart of an exemplary process, in which a data device in a rental store synchronizes data with a data device near the video rental store, according to some embodiments;

FIG. 21($b$) is a flowchart of an exemplary process, in which a home data device synchronizes data with a data device in a motor vehicle near a home, according to some embodiments.

DESCRIPTION OF EMBODIMENTS

The invention can be implemented in numerous ways, including as a process, an apparatus, a system, a composition of matter, a machine readable medium such as a computer readable storage medium or a network wherein data are sent over communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. Although the invention is described in connection with such embodiments, the invention is not limited to any such described embodiment. The invention encompasses numerous alternatives, modifications and equivalents. Specific details are set forth in the following description in order to provide a thorough understanding of the invention. These details are provided for the purpose of illustration and invention may be practiced without some or all of these specific details. For the purpose of clarity, technical material that is known in the technical fields related to the invention has not been described in detail so that the invention is not unnecessarily obscured.

Figure 1:
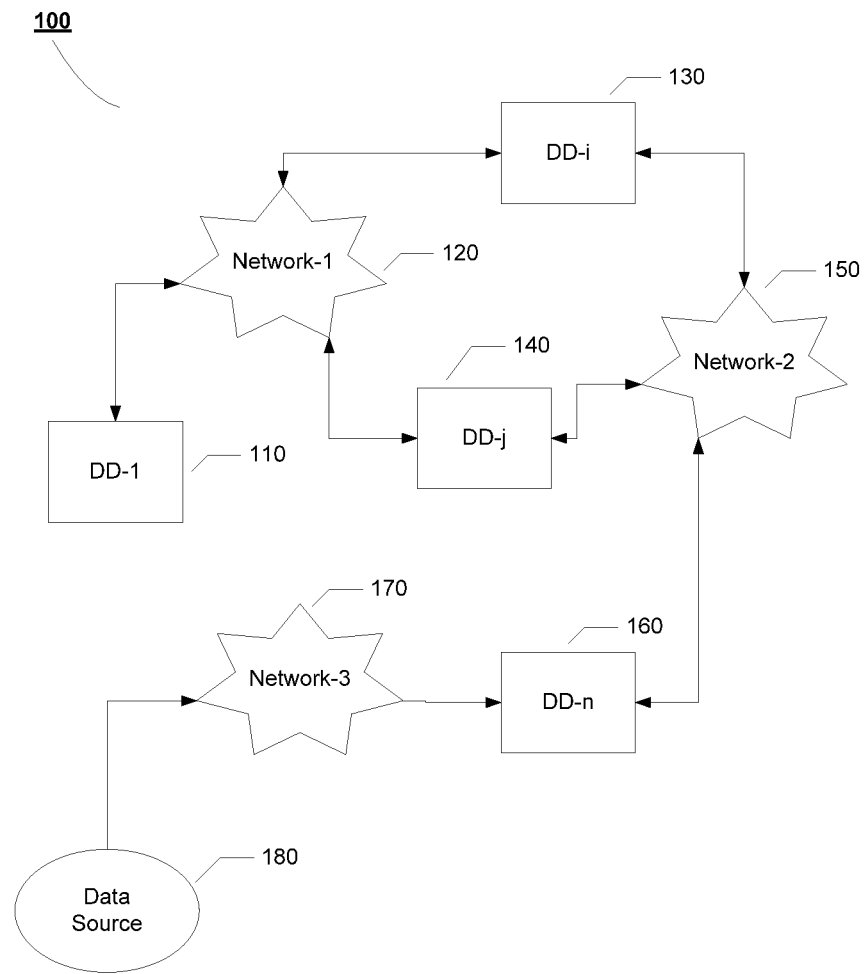
FIG. 1 depicts an exemplary high level construct of an automated data device synchronization scheme, according to some embodiments.

FIG. 1 depicts an exemplary high level construct 100 of an automated data device synchronization scheme, according to some embodiments. Synchronization refers herein to transmission and/or reception of information performed to seek coherency among two or more parties. An example of coherency is increased similarity. In some embodiments, synchronization, as referred to herein, may include storage of received information. Parties involved in synchronization may correspond to articles, devices, machines, or operational entities such as software, objects, and/or modules. Synchronization, as referred to herein, may include synchronization of any information, such as data or operational state. Data to be synchronized may include multimedia content, metadata, and other types of auxiliary information such as descriptive data or administrative data. An example of descriptive data is data related to operational state. An example of administrative data is data related to operational controls. Operational state refers herein to one or more conditions experienced by a machine, a device, or an article, either in its operation or in its non-operation. Automated synchronization, as described below, may involve two or more data devices that automatically attempt to synchronize information. A data device refers herein to an entity, including a hardware, firmware, software, or an operational entity, that capable of synchronizing data. Examples of a data device include a laptop, a personal computer, a Personal Data Assistant (PDA), a pocket player, and a data player. In some embodiments, synchronization may be achieved through acquisition and/or replication. The former refers herein to a scenario in which a data device acquires information from one or more other data devices. The latter refers herein to a scenario in which a data device that possesses information provides the information to one or more other data devices.

A data device that provides information to other data devices during synchronization may be referred to herein as a source data device. In some embodiments, a source data device may refer herein to a transport data device. A transport data device refers herein to a data device that obtains (via, e.g. acquisition or replication) data from a source and then synchronizes such data with a recipient data device. A data device that acquires information from other data devices during synchronization may be referred to herein as a recipient data device. A data device may be both a recipient data device and a source data device. When a data device attempts to replicate data it previously synchronized through acquisition into other data devices, it may be referred to herein as a transport data device. For example, a data device may first seek to synchronize information from one or more source data devices and acquire that information. The data device may subsequently seek to synchronize the acquired information with one or more data devices (which may be distinct from the data devices from which the information has been acquired) by replicating the information into those data devices.

In the example of FIG. 1, the high level construct 100 comprises a plurality of data devices (data device DD1 110, ..., data device DDi 130, data device DDj 140, ..., and data device DDn 160) and one or more networks (network 1 120, network 2 150, and network 3 170). The depicted data devices may synchronize with each other via connections established through the depicted networks. A data device may also connect to a data source 180 through a network (e.g. network 3 170) to acquire data, which may be synchronized with other data devices.

A data device may be any device capable of communicating with other devices, receiving, and/or transmitting data. For example, a data device may be a multimedia player, including devices and systems of all manners that are capable of various multimedia data handling functionalities such as recording, receiving, storing, transcoding, transmitting, and rendering data in different media forms. Examples of multimedia data include data in audio, visual, textual, tactile, or olfactory forms and any combination thereof. Multimedia data may be digital or non-digital and may be transcoded from its native format to a transcoded format. For example, MP3 data transmitted over the air in waveforms may be transformed into corresponding digital form. Television broadcast over a cable in its analog form may be transformed into an MPEG stream. Encrypted data may be decrypted and vice versa. Data in one resolution may also be transcoded into data of a different resolution. Such transcoding may be performed to render data usable on a hosting data device or make it usable for another data device. Data rendering is to make data possible to be consumed perceptually. Examples of data rendering include displaying a visual image, playback of an audio or video stream, or presenting textual information in a readable form.

A data device may seek to synchronize data with another data device by acquiring data that is made available by the other data device, directly or indirectly. Data that can be synchronized includes data of all types. For example, a data device in a car associated with a household may seek to synchronize entertainment content (e.g. music, video, etc.) currently recorded on a different device associated with the household. To achieve this, the data device in the car may, for example, communicate with a data device in the household to automatically determine the content to be synchronized and then acquire such determined content from a data device in the house.

Figure 2:
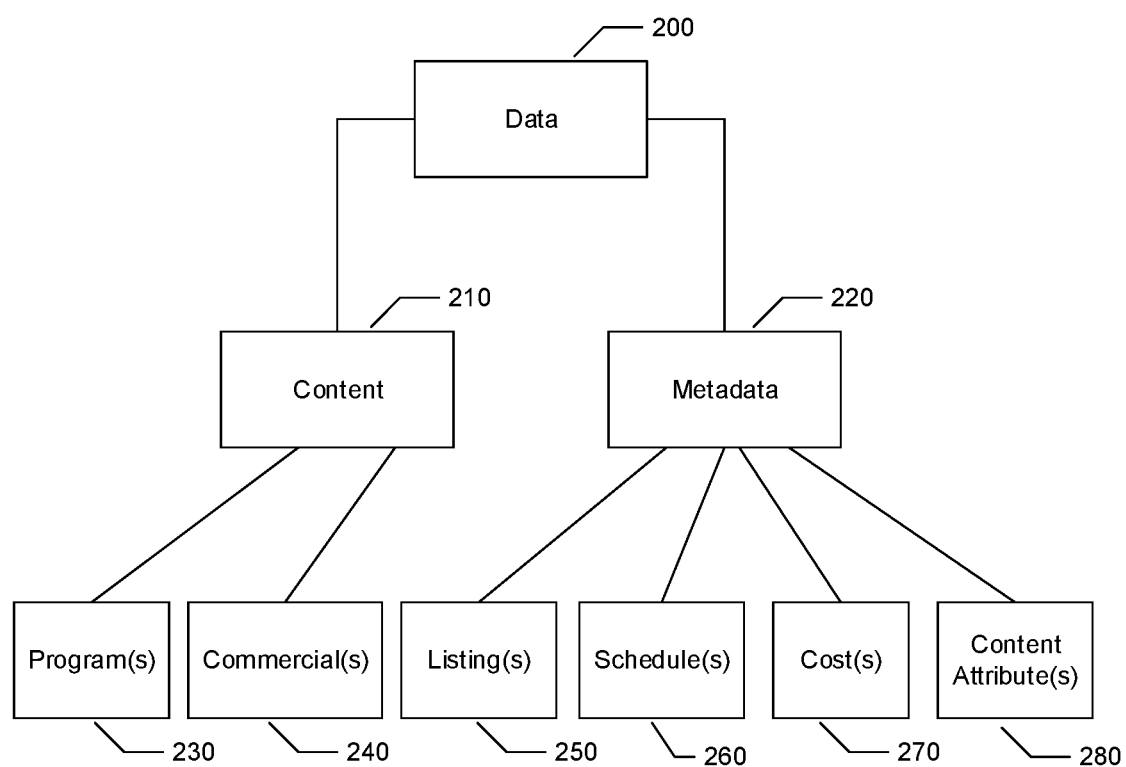
FIG. 2 illustrates exemplary types of data that can be synchronized according to some embodiments.

FIG. 2 illustrates exemplary types of data to be synchronized according to some embodiments. In this example, data to be synchronized 200 may include content 210 and/or metadata 220. Exemplary types of content include programs 230, commercials 240, etc. The programs 230 may include entertainment (e.g. movies, documentaries, music), news, and/or educational content (e.g. instruction materials or educational programs). The commercials 240 may include advertisements or infomercials.

Metadata 220 may include any types of information that characterize various attributes, which may or may not be associated with certain content. For example, metadata 220 may include a program listing 250 (e.g. a real estate listing or entertainment program listing), schedules 260 (e.g. an event schedule for a conference or schedules for upcoming broadcasts), cost information 270 (e.g. cost for each pay-per-view movie), and/or content attributes 280 (e.g. title, author, creation date, resolution, etc.). In some embodiments, a program listing 250 may also include a list of content items that could be acquired from a data source (e.g. data source 180) or from a particular data device, such as the data device providing the metadata 220. In some embodiments, metadata 220 may also include other types of information. For example, it may include information related to preferences or requests to acquire certain content if and when such content becomes available (not shown in FIG. 2). Such metadata may indicate an intent for future acquisition or synchronization of data represented as, for example, a wish list enumerating desired data expressed in terms of certain metadata criteria such as title, author, director, artist, genre, etc.

Referring back to FIG. 1, synchronization may be performed via communication links through one or more networks. The network 1 120, network 2 150, and network 3 170 represent generic networks, which may include the Internet, an intranet, a wireless network, a proprietary network, a local area network (LAN), a wide area network (WAN), a telephone network, and a cable network. One other example of a generic network is a direct connection between two devices. Each of the networks depicted in FIG. 1 can be any of the above mentioned networks, or another type of network, or a combination thereof.

Synchronization performed among distinct data devices may be achieved at different levels or in different manners. For example, synchronization may be carried out to generate an exact copy of some or all data on two devices. Synchronization may also be performed in such a way that synchronized data is identical except for, for example, its format and/or device specific resolution translations (including database transformations). Synchronization may also be performed according to, for example, a superset or subset relationship defined by one or more criteria. For instance, synchronized data may be limited due to a difference in available memory resources in related data devices so that certain portion of the data may be disregarded during synchronization. In other instances, the synchronized data may correspond to a filtered version of some desired data generated based on limitations imposed through, for example, acquisition preferences or access controls such as parental controls. For example, specific limitations may be placed in a profile associated with a user of a data device that restricts synchronization for the user to "children's content only". In this example, certain synchronization may not be permitted in order to comply with such access controls. In other examples, access control may be imposed on different parts of the data so that partial synchronization may still be accomplished. For example, portions of a movie containing violence may be filtered out due to access controls defined by parents to limit exposure to violence. Limitations as to types of media data may also be imposed. For instance, access right control may limit synchronizable data to be "music only".

A data device (e.g. data device DD1 110) may synchronize data with one or more other data devices. For example, the data device DD1 110 may synchronize data directly with a single data device, e.g. DDi 130, through network connections such as through the network 1 120. A data device, e.g. the data device DD1 110, may also synchronize data indirectly with another data device, e.g. the data device DDn 160, through a third party transport data device, e.g. the data device DDi 130, via network connections.

In some embodiments, a data device such as DD1 110 may synchronize data with more than one other data device. If more than one copy of the data to be synchronized resides on more than one source data device, the data device DD1 110 (or recipient data device) may acquire data from more than one source data device that has a copy of the data. For instance, the data device DD1 110 may synchronize data with data devices DDi 130 and DDj 140. Synchronization with more than one data device may be conducted in either serial or parallel mode, or a combination thereof. An example of synchronizing in serial mode is for the data device DD1 110 to acquire data from DDi 130 and DDj 140 in a serial manner. In this example, DD1 110 may first acquire a portion of the data to be synchronized from DDi 130 and then a remaining portion of the data from DDj 140. An example of synchronizing in parallel mode is for DD1 110 to acquire different portions of the data simultaneously from DDi 130 and DDj 140. In some embodiments, a data device DD1 110 may synchronize with multiple data devices in different operational modes. For example, synchronization with some of the data devices may be direct and some may be indirect. For instance, the data device DD1 110 may synchronize with the DDj 140 via a direct communication and with the DDn 160 via an indirect communication through the data device DDi 130. In some embodiments, one source data device may first supply a portion of the data to another source data device and then later both source data devices may supply the data in parallel to the recipient device.

Each of the data devices as depicted in FIG. 1 may be optionally connected to one or more data sources 180 from which the connected data device may receive data. The data source 180 may deliver data to the connected data devices through a one-way communication link such as a downstream data transmission or a broadcast. In this case, the data device connecting to the data source may receive the data transmitted by the data source such as in broadcast scenarios. The data source 180 may also support two-way communication. In this example, a data device connecting to the data source 180 may be able to communicate with the data source as to what data is to be received, such as video on-demand services offered by cable operators. In some embodiments, upstream communication capabilities may be limited, for example by having a lower communications rate than downstream communications.

Figure 3:
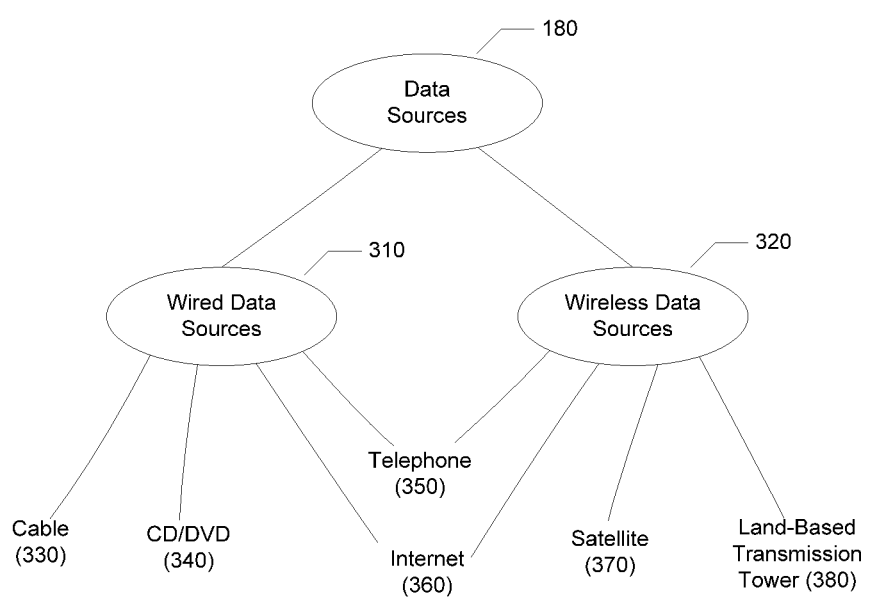
FIG. 3 illustrates exemplary types of data sources according to some embodiments.

The data source 180 may deliver data through different types of channels. FIG. 3 illustrates exemplary types of the data source 180 according to some embodiments. In this example, the data source 180 may correspond to a wired data source 310 such as a cable data source 330, a data source 360 via a wired Internet connection, a CD/DVD data source 340, or a data source 350 via a wired telephone connection. The data source 180 may also correspond to a wireless data source 320 such as a data source 360 through a wireless Internet connection, a data source 350 via a wireless telephone connection, a satellite based data source 370, and a data source based on wireless land-based tower transmission 380.

The data devices as described in FIG. 1 are capable of performing automatic synchronization. The "automatic"

aspect of synchronization may be facilitated by automatic detection of connectivity needed to synchronize with little or no user intervention, automatic determination of the data to be synchronized, and/or opportunistic detection and use of such detected connectivity and available (e.g. potentially underutilized) bandwidth to achieve synchronization. In addition, synchronization as described herein may also incorporate explicit or implicit directions to carry out desired synchronization. Such directions may include directions as to particular data to be synchronized, a time a synchronization may be performed/completed, and/or one or more source data devices with which data may be synchronized. Both explicit and implicit directions may be obtained based on user specified parameters/criteria or derived automatically from various types of known or acquired information. For example, directions as to how to perform synchronization may be derived based on information related to preferences (of content, of timing, etc.) associated with a data device for which synchronization is sought.

Synchronization as described herein may be carried out in a continuous operational mode or in an opportunistic operational mode. Continuous operational mode refers herein to a scenario in which synchronization may be carried out without any disruption until it is completed. This may associate with continuous network connectivity during the synchronization. Such continuous network connectivity may be achieved via an exclusive network usage scheme and/or a fault tolerance mechanism so that when one network route is disrupted, an alternative network route can be switched in to facilitate continuous synchronization operation. Opportunistic operational mode refers herein to a scenario in which synchronization may be achieved via intermittent network connections. After each network connectivity disruption and eventual reconnection, data devices involved in the synchronization may be capable of properly resuming the synchronization operation. Details related to opportunistically utilizing intermittent network connectivity to achieve synchronization are described with reference to FIGS. 4 and 16.

FIG. 4(*a*) is a flowchart of an exemplary process, in which a data device bidirectionally synchronizes data with another data device through automated synchronization, according to some embodiments. In this example, network connectivity is detected at 400. A data device may synchronize data, at 402, with a source data device. A source data device refers herein to a data device that sends data to a recipient data device via synchronization. Details related to operations of a source data device are described with reference to FIG. 4(*c*). A recipient data device refers herein to a data device that receives data from another data device via synchronization. Details related to operations of a recipient data device are described with reference to FIG. 4(*b*). A data device may also synchronize, at 404, data with a recipient data device. A data device, as described in FIG. 1, may serve as a recipient data device, a source data device, or both. In some embodiments, the source data device at 402 may be the same data device as the recipient data device at 404.

FIG. 4(*b*) is a flowchart of an exemplary process, in which a data device synchronizes data with a source data device, according to some embodiments. In this example, to accomplish synchronization, a data device seeking synchronization, herein referred to as recipient data device, may first detect, at 410, the presence of one or more potential source data devices. Details related to detecting presence of source device candidates are illustrated in conjunction with FIG. 7. Based on the detected presence of such candidates, it is determined, at 420, data to be synchronized and the order of acquiring such data. In some embodiments, this determination may be made by the recipient device, one or more source data devices and/or one or more third party devices. The recipient device may select, at 430, one or more source data devices with which the synchronization is to be carried out. In some embodiments, such selection may be made by one or more source data devices and/or one or more third party data devices. Such selection may be based on various considerations related to, for example, efficiency and availability of data/resources on the candidate source devices. In some embodiments, when the synchronization is to be performed in an opportunistic operational mode, for each resumed synchronization session, source data devices may be reselected based on the acquisition state recorded, for instance, during a previous session. If data is to be acquired from multiple sources and acquisition of certain portion(s) of the data from some source data device(s) may have been completed, those source data device(s) are not reselected in this example. Exemplary details related to selection of source data device(s) are discussed in conjunction with FIGS. 10 and 11.

The recipient data device may also optionally determine, at 440, an acquisition plan based on the current acquisition state. In some embodiments, such an acquisition plan may be determined by one or more source devices and/or one or more third party devices. An acquisition plan may include a plan to acquire particular content. An example of constructing an acquisition plan may occur in opportunistic synchronization, wherein this operation may be carried out to resume an interrupted data acquisition prior to data acquisition in a resumed session after an intermittent network connection is detected. Optionally, resources required to accomplish data acquisition, such as communications, processing and/or storage resources, may be allocated and reserved, at 450, prior to acquiring data. Selecting source data devices may be performed either prior to or after resource allocation and reservation. In some embodiments, a selection decision related to source data device(s) may depend on whether adequate resources may be allocated in selected source data devices. In this example, resource allocation and reservation may be performed prior to source data device selection. In other embodiments, availability of resources may not be a concern. In this example, source data device(s) may be selected prior to allocating/reserving resources. In some embodiments, the selection of source data device(s) and resource allocation/reservation may form an iterative process until all necessary and/or available resources are reserved with respect to selected source data device(s). In some embodiments, one or both of source data device selection and resource allocation/reservation are not performed. For example, the source data devices may be the ones with which the recipient device established a connection. In this example, synchronization may be performed using whatever resources are available in an opportunistic manner. Exemplary details related to resource allocation and reservation are discussed in conjunction with FIG. 12.

Data to be synchronized may be acquired, at 460, from one or more source data devices. Details related to data acquisition during synchronization are discussed in conjunction with FIGS. 13, 14, and 15. Acquired data may be optionally replicated, at 470, through which the acquired desired data may be further synchronized with one or more recipient data devices. Exemplary details related to data replication are discussed in conjunction with FIG. 16.

Various exemplary embodiments related to determination of data to be synchronized are described below. The determination of data to be synchronized may be made based on information related to, for example, what is desired by the recipient data device (such as preferences) and lists of data available on the one or more other data devices. Other aspects related to the synchronization may also play a role in determining the data to be synchronized. For example, availability of resources required to perform synchronization may also be taken into account. Details related to determining data to be synchronized and an order of acquisition are discussed in conjunction with FIG. 9.

Figure 5:
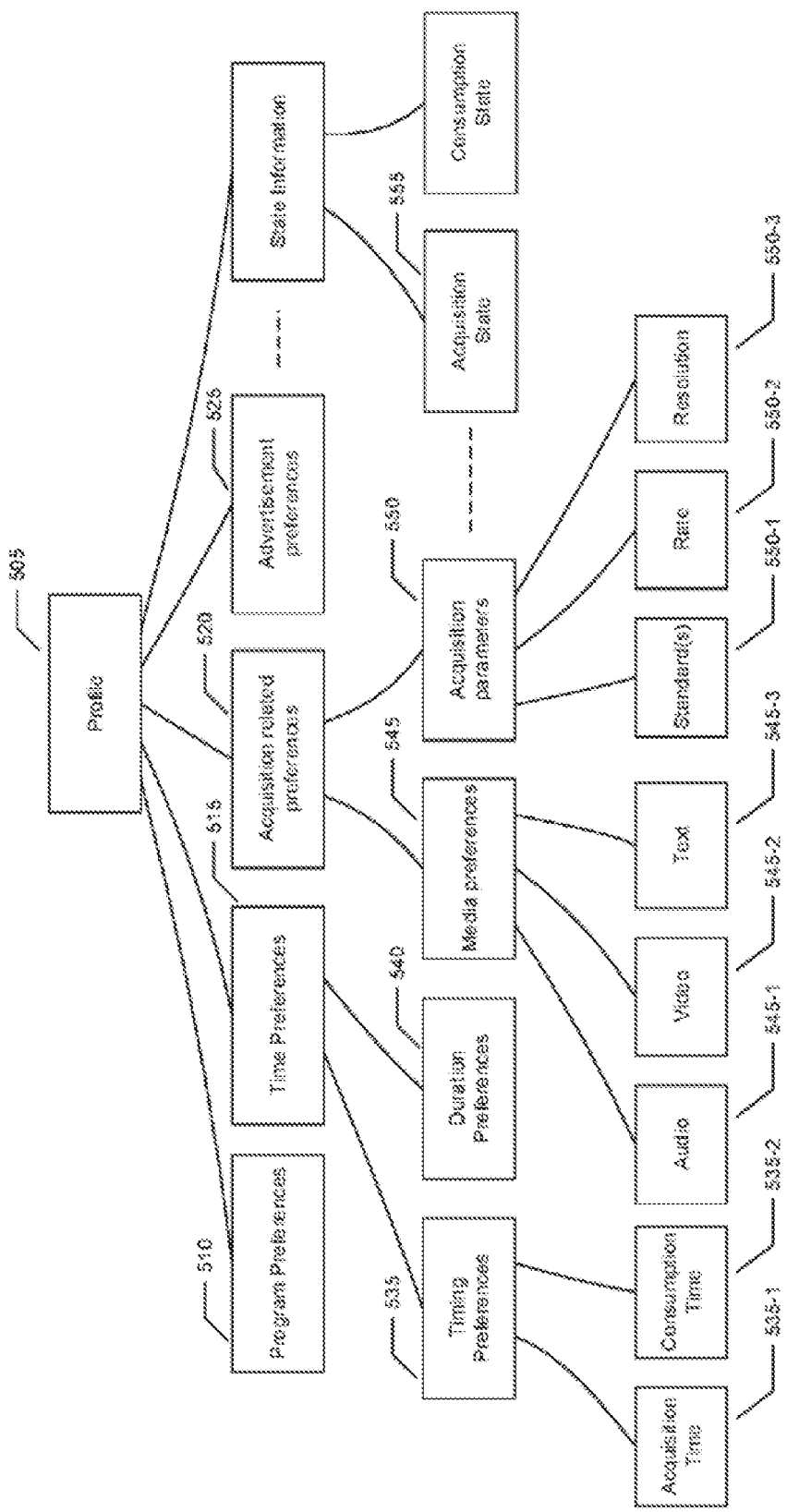
FIG. 5 shows exemplary components in a profile according to some embodiments.

In some embodiments, references as to data content may be derived based on a profile characterizing different perspectives. FIG. 5 shows exemplary components in such a profile according to some embodiments. In this example, a profile 505 may contain information characterizing preferences with respect to various aspects of data. For example, the profile 505 may include program (content) preferences 510, time related preferences 515, acquisition related preferences 520, advertisement related preferences 525, and/or state information 530.

The program preferences 510 may include information related to preferences regarding content. This may include a list of preferred data or content or programs. Such listed programs may meet one or more metadata criteria such as title, author, director, artist, etc., individually selected or in arbitrary combinations, or fuzzy matches to other content deemed to be especially desirable. The selection may be by manual and/or automatic means, e.g. through user selection or collaborative filtering. Items on a preference list may be generated in different modes. For example, a user may explicitly enter desired items through a manual operation, e.g. selecting an item from a list of content items through a graphical user interface.

Items on a preference list may also be generated in a semi-automated mode. A user may enter one or more criteria that an item may satisfy, and an automated selection program may select any item that satisfies the given criteria. For example, such criteria may be related to metadata criteria (e.g. a movie with a particular actor or directed by a certain director). Other parameters related to data may also be used for selecting preference list items. For example, a user's ratings of similar programs may be used to guide how to choose wish list items. A user may provide rating inputs as to likings for content that the user has reviewed. Such rating inputs may be scaled to a pre-defined range (e.g. a numeric range between 1 to 10, with 10 being the highest rating or a verbal range such as "I hate it", "It is not my favorite", "It is all right but not great", "I like it", and "I love it") or expressed using natural language like ratings, which can be processed subsequently and mapped to a scale automatically. Based on such user provided ratings, the user preferences as to content may be automatically extracted from such inputs and utilized to determine items on a wish list. For example, if a user consistently rated action movies played by a certain actor highly, the automated selection program may choose those programs to place on the wish list that are characterized as action movies in which the particular actor has a role.

The preference list may also be generated in a completely automated manner. For example, there may be some monitoring mechanism on a data device that observes the viewing habits of a user and then generates ratings or preferences automatically based on such observed viewing habit. Programs that are watched more often and/or for a longer period during each viewing may be automatically rated higher than others. Such automatically generated ratings may be used to determine items to be included on a wish list.

A preference list may be represented in a data device in different forms. Such a preference list may contain data preferred as well as, for example, certain metadata, which may be used in determining desired data. The following provides an exemplary tabular representation of a preference list:

| Item ID | Importance | Title | Artist | Genre | Keywords |
|---|---|---|---|---|---|
| 1 | 1 | The Apprentice | | Reality | |
| 2 | 99 | Sesame Stree | | Educational | |
| 3 | 23 | | Clint Eastwood | | |
| 4 | 10 | Nova | | Documentary | |
| 5 | 99 | | | Movie | Karate |

The above tabular format of a preference list may be stored in a database as a table, as an XML representation, or in any other storage forms as known in the art. For example, the above table may be equivalently represented by the following XML:

```
<preferences>
    <Item><ID>1</ID><Importance>1</Importance>
        <title>The Apprentice</title><Genre>Reality</Genre></Item>
    <Item><ID>2</ID><Importance>99</Importance>
        <title>Sesame Stree</title><Genre>Educational</Genre></Item>
    <Item><ID>3</ID><Importance>23</Importance>
        <Artist>ClintEastwood</Artist></Item>
    <Item><ID>4</ID><Importance>10</Importance>
        <title>Nova</title><Genre>Documentary</Genre></Item>
    <Item><ID>5</ID><Importance>99</Importance>
        <Genre>Movie</Genre><Keywords>Karate</Keywords></Item>
</preferences>
```

In the above sample table, an importance score of 1 may be defined as the highest rating scale corresponding to "most preferred" and an importance score of 99 may be accordingly defined as the lowest rating scale corresponding to "least preferred". Integer importance scores are provided merely as an illustration. Any other measuring scheme may be adopted, such as floating point importance scores or relative rankings. In some embodiments, a preference measure, for example a globally defined preference measure, for specific categories of content such as "recently authored", "short duration", or "high fidelity", may also be used to indicate the importance of each piece of content. Alternatively, such global preference measures may also be used in conjunction with an individually indicated importance for each item.

Each importance score of a particular piece of data (e.g. a movie) may be used as an indication of a user's desire to acquire matching content. In the above example, it is more desirable to obtain content with "Clint Eastwood" as an artist (importance level 23) than it is to obtain content having a title including the substring "Sesame Stree" (importance level 99) such as the children's show Sesame Street would match.

In some embodiments, negative preference measures may also be used to rate content, and such measures may provide information regarding what matching data should not be acquired. For example, zero or negative rating measures that are outside of a defined range of rating scores may be used for such purposes.

The time preferences 515 may relate to matters regarding time in data synchronization. For example, it may include timing preferences 535, which may further include acquisition time preferences 535-1 and consumption time preference 535-2, and/or duration related preferences 540 which may indicate, for example, a limitation on the length of a program. The acquisition time preference 535-1 may specify a preferred time to synchronize data, which may be specifically defined by a user or automatically derived based on, for example, a preferred consumption time, low network utilization time, or other known or inferred constraints. The consumption time preference 535-2 may specify a time frame during which some desired data is preferably to be consumed. The preferred time frame to consume some data may be manually entered or automatically derived from other known or inferred constraints. For example, a user may enter a time frame during which the user's entire family will be on vacation away from home with a departure date and return date. In this case, the preferred consumption time for certain content (e.g. content contained in a wish list) may be inferred from such user-entered calendar information. Derivation of the consumption time preference may be performed in conjunction with derivation of a wish list for the same planned trip based on program preferences as described above so that data desired as described on the wish list can be synchronized with appropriate sources prior to the known departure date, in order for the family to be able to take a copy of certain content with them for consumption during the vacation.

There are other time-related preferences that may be imposed on content. For example, a restriction may be placed on an item that may indicate that only first-run presentations or presentations within a certain time period of a first run (for example one week, or a configurable period) or only live presentations will be deemed desirable or important. In implementations according to some embodiments, time related preferences might be specified as additional restrictions in a preference list as illustrated above. In such implementations, a list of preferences or an item in a list of preferences may include time-related restrictions, in addition to ratings, that may provide information related to selecting preferred or matching content. Matches against preferences such as within a week of first run may be performed by comparing the date on which the content is scheduled to broadcast with metadata for the content, such as the date of first broadcast. Some of such preferences may be matched by checking metadata for the content for the presence of a "rerun" attribute vs. a "first-run" attribute.

The duration preference 540 may be used in selecting a specific piece of data to be synchronized. For example, if a preferred duration is specified as one hour plus or minus ten minutes, only content that is within that duration constraint may be acquired or synchronized. The duration preference information 540 may be manually specified or automatically determined. For instance, if the user planning a vacation trip also acquired driving directions to the vacation site, which may have information related to an estimated length of time that it will take for the family to drive from home to the vacation site, then a duration preference for a movie to be played to the children in the car while driving to the vacation site may be accordingly inferred and used in determining what content is suitable for that particular purpose. An example of inferring a duration preference based on an expected trip duration is to choose a duration preference that is slightly less than the expected trip duration, for example ten percent less. Another example of inferring a duration preference from an expected trip duration is to choose multiple duration preferences that add up to an amount of time similar to the expected duration. For example, an expected trip duration of 100 minutes could be used to infer duration preferences for programs approximately 60 and 30 minutes long.

The acquisition-related preferences 520 may include information such as media preferences 545 and related acquisition parameters 550. The media preferences 545 may indicate in what medium data to be synchronized should be. Different choices of media may include, but are not limited to, audio 545-1, video 545-2, text 545-3, tactile (not shown), or olfactory (not shown). Media preferences 545 may be determined based on different considerations. For example, media preferences may be constrained due to limitations of the data device acquiring the data (e.g. a data device may support only low bandwidth traffic so that data in audio form is preferred over data in video form). The media preferences 545 may also be determined based on other factors. For instance, a user may prefer to listen to a desired program (as opposed to watching) while driving. In this case, data in audio form is preferred. Another user may prefer to watch video with captions (text) without sound (e.g. for a deaf user).

The acquisition parameters 550 may indicate parameters related to acquired data that maybe acceptable or preferred on an acquiring data device. Such parameters may include preferred standards 550-1 according to which the acquired data is preferably formatted, preferred rate 550-2 associated with the data (e.g. the frame rate of a video stream), or preferred quality or fidelity such as the resolution 550-3 of the acquired data. Those parameters may be device dependent. For instance, the data rate 550-2 and the resolution 550-3 may be constrained by what the underlying data device is capable of handling based on its system configurations.

In an implementation according to some embodiments, a list of preferences or an item in the list as described above may also include information related to the desired fidelity for obtaining the content. For example, an item may include a preference for obtaining the content in a high or a low resolution or particular format, such as requiring or preferring an HDTV recording.

In some embodiments, the profile 505 may also include preference information regarding a source of data such as broadcast channels (not shown in FIG. 5). When such a preference is present, items in a preference list may be matched against schedules for content delivery channels. For example, a data device may be configured to possess schedules for content available on a cable television feed, including a specific lineup of channels. Such schedules may be acquired from commercial vendors, such as Tribune Media Services, and their development feed on www.zap2it.com. That example feed is currently in XML. A data device may acquire content delivery schedules for some period of time, such as from the current day through some number of days that follow, such as 7 days later. Matching of items in a preference list may be performed by sequentially comparing each item in the preference list against each item in a list of scheduled content broadcasts. Other techniques using databases, indexing engines and other algorithmic methods known to those skilled in the art may also be used to extract a set of matching items.

The advertisement preferences 525 may indicate types of advertisement materials a user may prefer to receive (including not to receive any advertisements), with particular types of other data or independent of such other data. Such preference information may be explicitly specified by a user or may be inferred by the user's viewing habits. For example, if it is observed that the user often turns down the volume or fast-forwards whenever any advertisement is on, the advertisement preference 525 may indicate that no advertisement is preferred. Such information may also be derived based on other types of data stored on the underlying data device. For instance, a shopping record (e.g. a grocery list, or Internet transactions entered in the past 6 months) may be used to infer what kind of advertisement a user may prefer to see based on what has been purchased and the frequency of purchasing certain items. The advertisement preference information 525 may be used in determining whether to acquire advertisement-related data, either alone or with other data.

Another type of information that may be included in a profile is state information 530, which may be used to record state with regard to data synchronized or data to be synchronized. Such state information may include, for example, state related to acquisition state 555 regarding some scheduled synchronization, or data consumption state 560 regarding the consumption status of data that has been synchronized. The state information 530 may be explicitly or implicitly generated. An example of explicit generation of state information 530 is that a user may enter a list of content to be synchronized, which may be used to form explicit state information, indicating that certain synchronization operations are pending and may be initiated whenever appropriate opportunities arise. In some embodiments, state information 530 may be generated automatically. For example, a data device may record dynamic status information related to a particular synchronization. This may be an important practical feature for, e.g. opportunistic synchronization. In this example, data to be synchronized may be acquired during more than one session, and acquisition status state may be recorded at the end of a session. For instance, a starting point for the next acquisition session may be recorded so that when connectivity is detected, such state information may be used to properly resume acquisition.

Synchronization as described herein may involve not only synchronizing content (e.g. determining what to acquire from which source data devices) but also synchronization of other types of operational parameters such as state information (e.g. describing which portion of the data is to be synchronized during which acquisition session) and/or acquisition parameters as discussed above. When two or more data devices are connected, they may synchronize with each other with regard to various elements of their individual states. When two devices are out of sync (e.g. differences are detected), such detected conflict may be resolved to reach state synchronization. Conflicts may occur either during the initial connection (e.g. when two devices are configured differently) or when an intermittent connection is detected to resume opportunistic synchronization (e.g. desired content initially on a synchronized source data device has been deleted after a previous connection so that the recipient data device and the source data device are now out of sync). Synchronizing states between two data devices may involve selecting appropriate source data devices (that can make the desired content available), deriving an acquisition plan/scheme that is feasible and can be facilitated by both devices (e.g. determining where to start acquisition, acquisition parameters such as data rate, resolution, bandwidth, transmission speed, as well as the needed transcoding operations, etc.).

Another aspect of state information may relate to information about how data is consumed or consumption state 560. For example, a data device may record what has been consumed (played) and when, and/or by whom. The consumption state information 560 may be optionally used to determine, for example, play orderings in an automated playback mode or to show users what has been seen/listened to, when, and by whom. Another piece of information that may be stored as consumption state information 560 is what portion of a piece of content was played when the content or the playing thereof was incomplete (for use in continuing to play on any other player). For example, when only a portion of data to be acquired during opportunistic synchronization may have been acquired and consumed, consumption of the rest of the data may start from an appropriate point, for example the point at which playback was terminated, or the beginning of a scene during which playback was terminated. Therefore, information related to what has been consumed so far may be recorded to facilitate consumption of the rest of the data.

In some embodiments, a profile 505 may be established with respect to an individual user of a data device. Synchronization may be performed with respect to an individual user. In this example, a profile established for such an individual user can be used to determine what and how to synchronize for this particular individual user. A profile for an individual may be dynamically updated, manually, semi-automatically, or automatically, as described above.

In some embodiments, a profile may be established across a group of users, who may be different individual users of a same data device or users associated with more than one data device. A profile established for more than one user is referred to as an aggregated profile. The group of users under an aggregated profile may be linked through user-based affiliations (e.g. friends), device-based affiliations (e.g. all the users of a data device, or the data devices used in a household), or a combination thereof (e.g. all devices in a household and all the friends associated with the family members). Preferences determined based on an aggregated profile may correspond to aggregated interests of the underlying users. For example, if an aggregated profile is established across different family members of a same family (with one or more data devices in the household), preference information contained in this aggregated profile may represent the aggregated interest of the family. Synchronization performed based on such aggregated preferences may acquire data desired by different members of the family. An aggregated profile may be updated dynamically in terms of the scope of the aggregation (e.g. some family member may move out of the household) and/or preferences of the individual users in the aggregated group.

In some embodiments, including embodiments in which aggregated content may be selected based on an aggregated profile, an individual user's access right to specific pieces of synchronized data may be optionally further controlled through, for example, some data sharing scheme, through which each individual user within an aggregated group may be restricted to access only certain types of content. For example, parents in a household may place content access control or restrictions, e.g. in the form of data sharing policy, on a multimedia player used by their minor child. In this example, data acquired based on an aggregated profile (or preferences) may be stored on a data device (e.g. a home base multimedia player) used by the parents. Such acquired aggregated data may be further synchronized (or distributed) among data devices used by individual family members where specific masking or filtering may be set up on each of such secondary data devices that implements data sharing policy to be applied to individual users.

In some embodiments, data sharing policy may specify access controls in the form of restrictions or enablement. A data sharing policy may be defined explicitly or implicitly. An example of an explicit data sharing policy is a prohibition on transmitting certain categories of data (e.g. confidential information) to other data devices. A data sharing policy based on affiliation types may be an example of an implicit data sharing policy. For instance, in some embodiments, the presence or absence of an affiliation with another data device may control transmission or acceptance of data. For example, the presence of an affiliation between a data device and a second data device may, as a data sharing policy, enable a data device to send or respond to queries for all types of data. Alternatively, the presence of an affiliation may, as a data sharing policy, permit a data device to accept a list of affiliations that a connected data device provides, which subsequently may enable the data device to attempt to establish transitive affiliation relationships with those data devices contained in the list. Another example is that the absence of an affiliation between a first data device with a second data device may, as a data sharing policy, restrict the first data device from sending any or specific categories of content to the second data device.

In some embodiments, transitive affiliation may be controlled by configurable policies. For example, a policy may be specified only certain types of affiliates whose affiliates will be transitively adopted, or that affiliates not explicitly specified may not be a transitive affiliate conduit. Such configurable policies may be specified, for example, through a user interface or by synchronizing with another data device to download particular settings including such configurable policies.

Data sharing policies may differ in distinct data devices. In some embodiments, a data sharing policy may differ in data devices that are affiliated. For example, if A and B are mutually affiliated data devices, then A and B may have different data sharing policies. If A is a commercial server, facilitating a content distribution system, then A's data sharing policy may, for example, include supplying requested content to affiliate B, but not accepting content from affiliate B, and not transitively accepting affiliations with B's affiliates. In contrast, B's data sharing policy may include accepting content from affiliate A, but neither supplying content, nor lists of content, to affiliate A.

In some embodiments, data sharing policies may be derived dynamically based on changing situations. For example, two data devices connected for synchronization may form dynamic data sharing policies based on preferences specified in their individual profiles. A dynamic data sharing policy may also be dynamically formed based on state information associated with communicating data devices. For example, if memory on a data device is temporarily malfunctioning, an indication of this malfunction in the recorded state information associated with the data device may be used to generate a temporary data sharing policy that may restrict any type of data sharing that uses the malfunctioning memory device.

Figure 6:
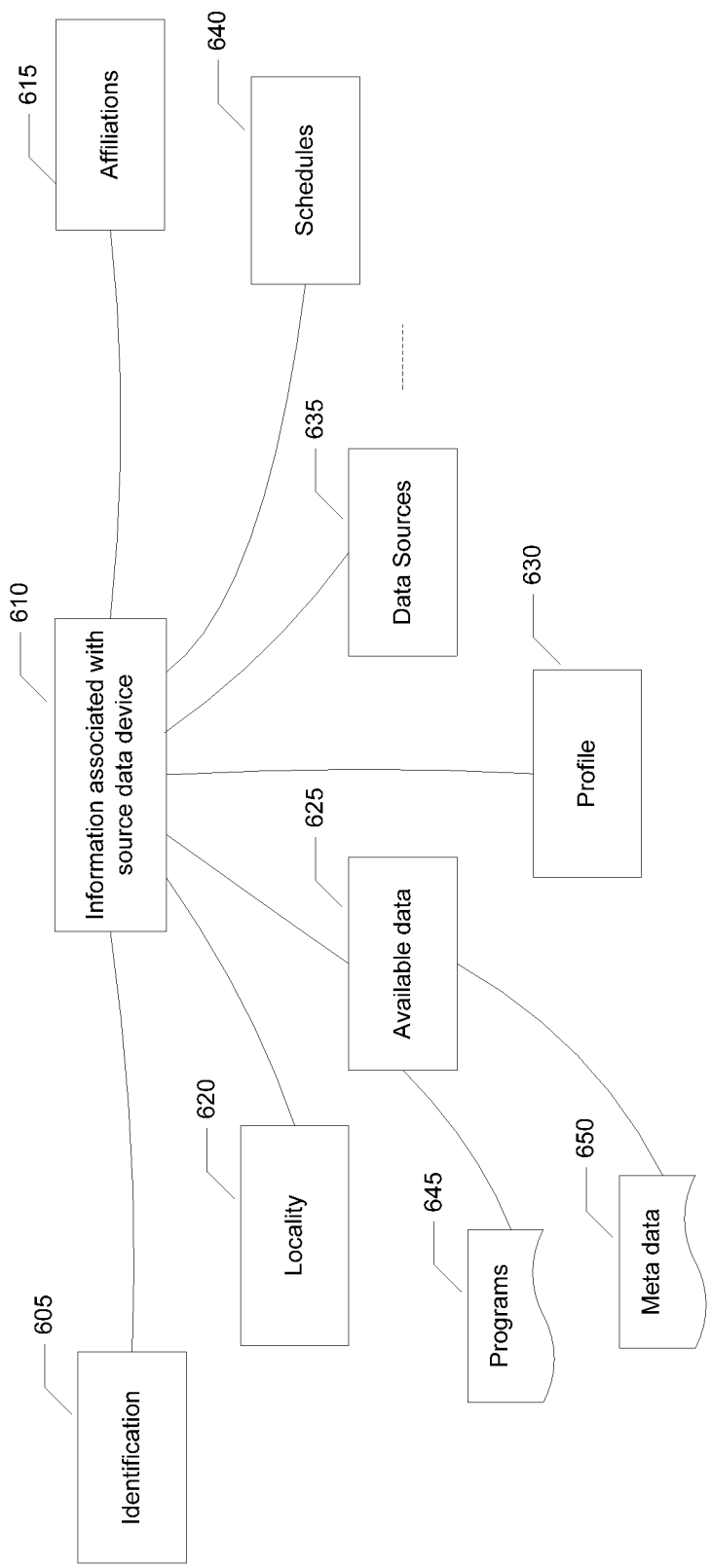
FIG. 6 shows exemplary types of information describing a source data device, according to some embodiments.

Preferences as to data content and acquisition related parameters associated with a recipient data device may be compared with corresponding information from one or more source data device candidates in order to synchronize content in a synchronized state. Upon establishing a connection, a source data device candidate may send relevant information to the recipient data device to facilitate synchronization. FIG. 6 shows exemplary types of information describing a source data device, according to some embodiments. In this example, information related to a source data device 610 may include some or all of the following: identification information 605, locality information 620, data 625 available on the source data device, including programs (or data) 645 and corresponding metadata 650, and a profile 630 which may be constructed similarly to what is described with reference to FIG. 5. The information related to a source data device may also optionally include one or more data sources 635 from which the source data device may acquire data, one or more schedules 640 according to which the source data device candidate acquires data, and affiliation information 615 about one or more affiliates of the source data device.

The identification information 605 identifies a source data device candidate. It may correspond to an IP address, MAC address, serial number, or any other type of information that can uniquely identify the device. Locality information 620 may indicate a physical location the source data device candidate is currently at. Such locality may be represented by any representation of a physical location, for example a zip code, street address, or coordinates such as longitude and latitude. Available data 625 may be sent to the recipient data device so that it may be used to identify data to be synchronized and to determine whether to select a source data device candidate as a source for synchronization. Available data 625 may be organized to contain both the data/programs that are accessible and the metadata associated with such available data.

The profile 630 of the source data device candidate may be sent to the recipient data device to provide various types of information (for example as discussed in conjunction with FIG. 5) that may be useful for further synchronization purposes. For example, preferences of the source data device candidate may be used to synchronize with corresponding preferences of the recipient data device. Similarly, state information of the source data device candidate may be synchronized with state information of the recipient data device as part of, or preparation for, other data synchronization.

Information about one or more data sources 635 may also be transmitted to a recipient device so that a recipient data device may examine, for example, whether its desired content matches with available or potentially available content of a source data device candidate. One or more schedules 640 may contain information indicating data delivery scheduled within some future time period. This type of information may, for example, be used by a recipient data device to determine whether such future data delivery may provide data items contained, explicitly or implicitly, in the wish list of the recipient data device and optionally whether a scheduled delivery time satisfies a time constraint for receiving such data. In some embodiments, affiliation information 615 may be provided to a recipient data device so that the recipient data device may identify affiliates of a source data device candidate as its own transitive affiliates.

When a recipient data device receives information related to a source data device candidate (610), it may analyze the received information and make various decisions. For example, it may determine whether a candidate is able to provide one or more of the items contained in or desirable with reference to its own wish list, how many items the candidate can provide, the timing associated with those items, whether the candidate can provide such data with the fidelity the recipient device desires, etc. A recipient data device may also examine whether there are other sources it may access through a candidate to indirectly acquire data, and with what kind of schedule. Determinations related to such matters may be subsequently used in selecting one or more source data devices with which the recipient data device may synchronize. Details related to those determinations and selection of source data devices are discussed in conjunction with FIGS. 9, 10, and 11.

Figure 4A:
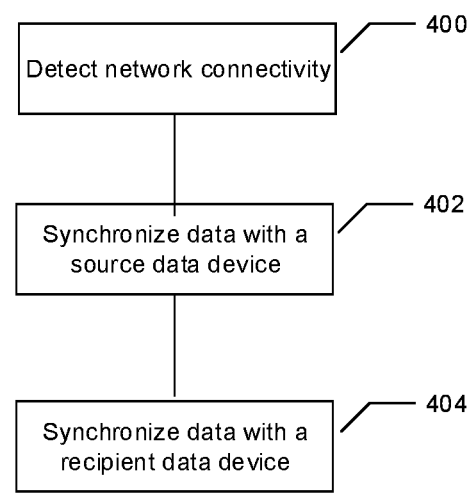
FIG. 4($a$) is a flowchart of an exemplary process, in which a data device bidirectionally synchronizes data with another data device, according to some embodiments.
Figure 4B:
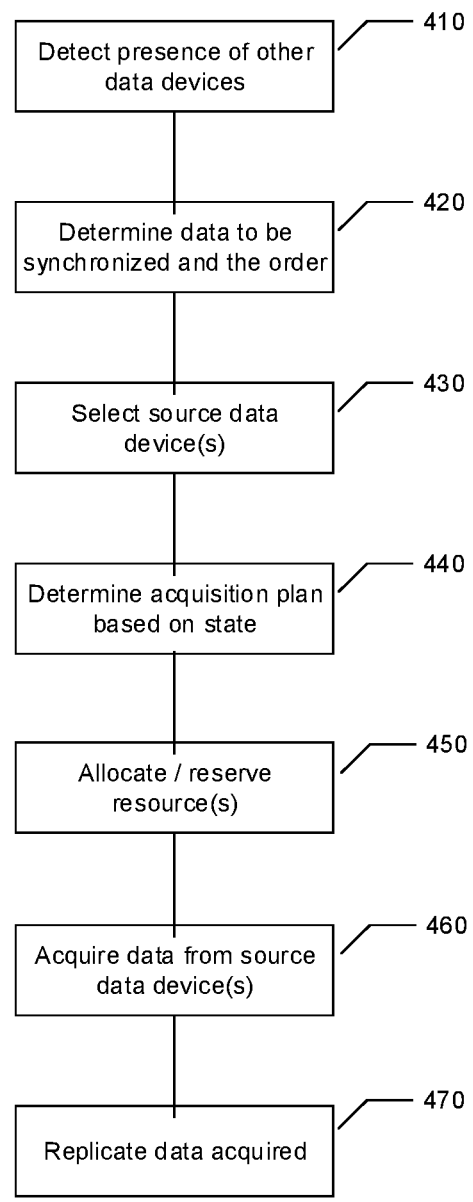
Figure 4C:
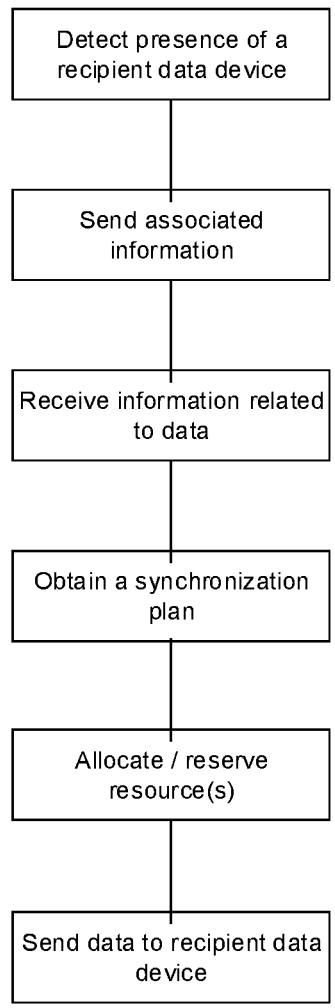

FIG. 4(c) is a flowchart of an exemplary process, in which a data device synchronizes data with a recipient data device, according to some embodiments. In this example, presence of a recipient data device may be detected at 405. Upon such detection, information associated with a source data device may be sent, at 415, to a detected recipient data device. As described herein, such information may be used to determine, either by a recipient data device or one or more other data devices (including one or more source data devices or one or more transport data devices or one or more third party devices) data to be synchronized. A source data device may then receive, at 425, information related to data to be synchronized, which may optionally include an order in which the data is to be synchronized. A source data device may also obtain, at 435, a synchronization plan, which may be derived by the source data device or the recipient data device, or received from another data device. In opportunistic synchronization, a synchronization plan may be dynamically generated during each intermittent network connection session. A source data device may also optionally allocate/reserve, at 445, resource(s) needed to facilitate synchronization of data desired. Data to be synchronized may then be sent, at 455, to the recipient data device. In this example, data may be synchronized with a recipient data device via either acquisition or replication.

Figure 4D:
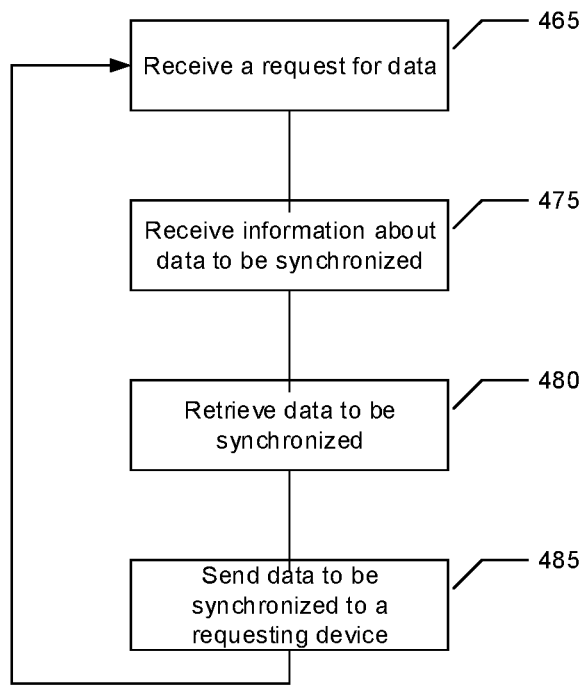

In some embodiments, a data supplying data device may only supply data upon request. Such a data supplying data device may include a server. For example, a server located in a video rental store may send a movie to a data device only upon a request. FIG. 4(d) is a flowchart of an exemplary process, in which a data device synchronizes data with a recipient data device upon request, according to some embodiments. In this example, a request for data is received, at 465, by a server data device. To determine data to be provided to a requesting data device, information related to data to be synchronized is received at 475. Such received information may then be used to retrieve, at 480, data relating to requested data. Retrieved data may be sent, at 485, to the requesting data device. In some embodiments, a server data device may continually detect a request for data to be synchronized. For instance, in a video rental store, a server data device that has access to stored movie data may continually receive requests from customer data devices for rental movie data.

Figure 7:
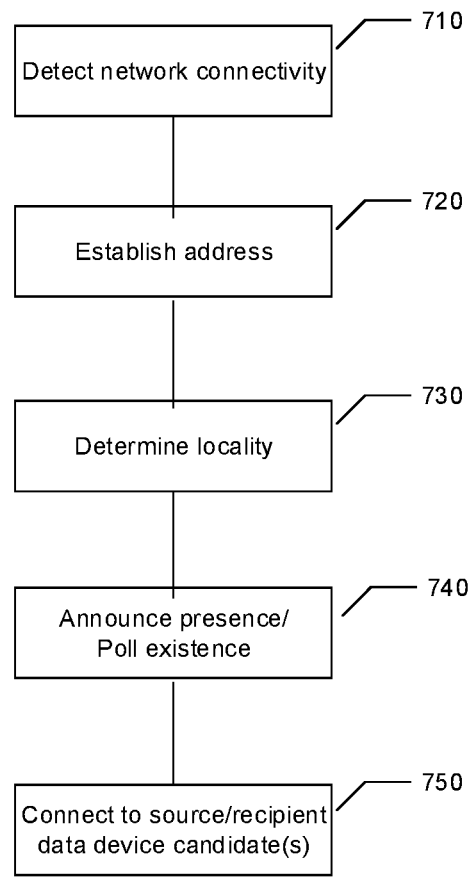
FIG. 7 is a flowchart of an exemplary process, in which one or more data devices may be detected, according to some embodiments.

FIG. 7 is a flowchart of an exemplary process, in which a data device detects the presence of other data devices according to some embodiments. In this example, network connectivity to one or different data devices is detected at 710. In some embodiments, a data device (e.g. a recipient data device) may automatically detect connectivity to another data device. For example, a previously unconfigured recipient data device may be connected to a network and then automatically detect network connectivity.

In some embodiments, the detected connectivity between a recipient data device and other reachable data devices may be intermittent. When connection is intermittent, a data device may opportunistically utilize connected periods to automatically acquire data. There may be alternative means to detect intermittent connections. For example, intermittent mobile network connectivity can be detected by operating system components such as the Microsoft Windows XP "zero client configuration service," followed by DHCP acquisition of an IP address.

Once connectivity is detected, a data device may, at 720, establish an address, such as an IP address, through which it may communicate. An exemplary way to establish an address is to receive an IP address via DHCP. The data device may optionally determine, at 730, locality information, which may be useful in determining, for example, connections with other reachable data devices and/or potential sources (e.g. content delivery channels) of desired data given a known current location for the data device. Location may be represented in different ways. One exemplary representation of location is using a coordinate expressed as (longitude, latitude). Another exemplary representation of location is a zip code. Locality information may be determined in different operational modes, including manual or automatic.

Figure 8A:
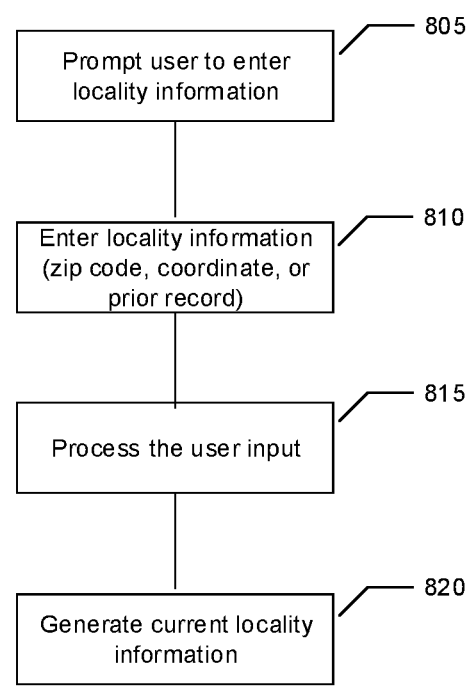
FIG. 8($a$) is a flowchart of an exemplary process to obtain locality information from a user, according to some embodiments.

In some embodiments, location data may be derived manually via, for example, user interaction, e.g. having a user enter locality information. FIG. 8(a) is a flowchart of an exemplary process to manually establish locality though user interaction, according to some embodiments. In this example, a user is first requested, at 805, to provide information related to a locality. A user then enters, at 810, information related to the requested locality data. Different types of information may be entered to allow direct or indirect derivation of needed locality information. For example, a user may enter an address, coordinate or a zip code that can be used to directly establish geographical locality. Alternatively, a user may enter an IP address that is to be used to translate into geographical location data. In some embodiments, a user may enter an instruction to retrieve a previously stored geographical locality as the current locality. The user's input is processed at 815. This may include determining the type of input received and operations to be performed (e.g. to retrieve a previously stored location data if the input is an instruction to use such previously stored location data). Operations that are deemed necessary to derive location data may be performed, at 820, to generate locality information.

In some embodiments, location data may be derived automatically. For example, location data may be derived from information contained in some received broadcasts. For example, a data device may derive location data from Extended Data Services (XDS) data extracted from one or more television broadcast channels. According to current XDS standards, XDS data may include time of day, station call letters, network, name of current show, V-chip style content ratings, etc. (The standards for XDS are included as a subset of the "Recommended Practice for Line 21 Data Service" which is defined by the Electronics Institute of America and provided in EIA-608-A.) XDS information may be extracted using known techniques implemented in, for instance, decoders such as the Zilog Z86229 eZSelect VBI decoders (information related to those decoders can currently be found on the Zilog web site at http://www.zilog.com/docs/tv/erselect_decoder.pdf).

In some embodiments, location data may be automatically derived based on other non-location related information contained in, for example, XDS data, which may for example include channel information that corresponds to certain content. Channels that are identified from their corresponding XDS data may be compared against known cable lineups, or known over-the-air lineups, to derive locality information. A match between channel information described in received XDS data with a known lineup may be used to derive the location of the receiver based on the transmission (or cable routing) coverage of the matched lineup's source and may then imply a geographic region (a location) where such a lineup is available. A lineup that matches all XDS extracted identities may be used to identify channels that are lacking XDS identity data. Alternatively, lack of broadcast signal on some channel(s) may also be used to match a lineup known to exclude the use of channel(s).

In some embodiments, location data may be automatically derived from a data device's IP address. In one example, a data device may contact a central server such as http://www.geourl.com or http://www.geoip.org to obtain location information. In another example, a data device may infer location data based on supported product functionality such as what is supplied by http://www.ip2location.com. In another example, location data may be extracted from a generic Internet service, such as what is described in IETF RFC 1712 (currently available at http://www.ietf.org/rfc/rfc1702.txt). Generic services such as proposed in RFC 1712 that are keyed on domain names may be queried based on the result of a reverse-DNS lookup to identify applicable domain name(s). Such servers, products and proposed services may provide estimates of the location of its IP address. If a Network Address Translating router rewrites the IP address before contacting Internet services, then the location revealed may be an estimate of the location of the router. The location of a router performing network address translation may, for example, be used as an estimate of the location of the data device.

In some embodiments, an address server such as a DHCP server or DNS server may provide location data in addition to an address to enable automatic locality estimation. (DHCP is defined in RFC 2131 and is currently available over the internet at http://www.ietf.org/rfc/rfc2131.txt.) In this example, a data device may obtain locality information based on the location data provided by an address allocator. For example, some Internet Service Providers (ISPs) may respond to a DHCP allocation request that includes a machine name (which corresponds to a user's account, which may be provided as a DSL or cable modem account) may be translated into a geographic address, such as a home address, by the ISP. In this case, corresponding location data may be included in DHCP allocations. In another example, corresponding location data may be used to populate data fields in a DNS entry, for example a dynamic DNS entry, and retrieved by a data device via a DNS lookup, which may optionally be preceded by a reverse DNS lookup to identify the corresponding host name. In another example, a DNS server such as a server on ISP premises may report its own location or the approximate location of an entity making a location query, either in response to a DNS query or a different protocol, which may be used as a location for the entity making the request.

Figure 8B:
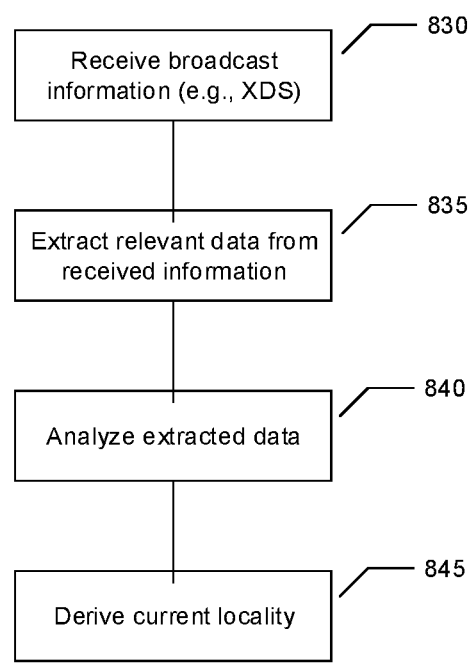

FIG. 8(b) is a flowchart of an exemplary process to automatically detect locality based on broadcast information, according to some embodiments. In this example, broadcast information such as XDS data is received at 830. Data that can be used to derive locality may be extracted, at 835, from the received broadcast information. Such extracted relevant data may be further analyzed at 840, and locality may be estimated or derived, at 845, based on analysis (or processing).

Figure 8C:
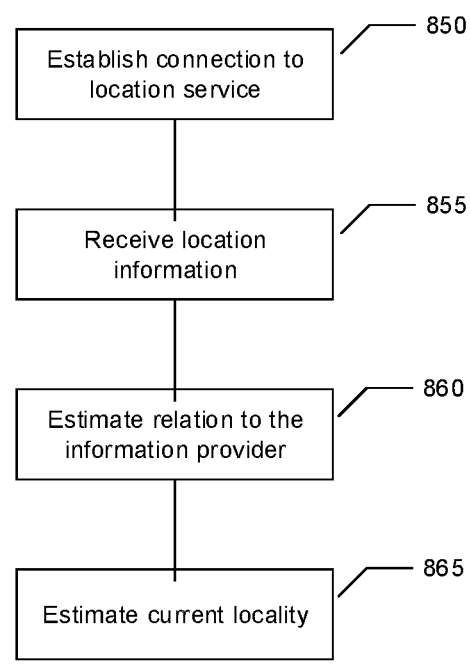

In some embodiments, location data may be automatically estimated, indirectly, based on location data received from one or more other location data devices. FIG. 8(c) is a flowchart of an exemplary process to automatically estimate locality based on location information from a location data device, according to some embodiments. In this example, a communications connection may be established at 850 with one or more location data devices. In some embodiments, a location data service may be available from a peer. In some embodiments, a location data service may be available from a server such as a DNS server or a DHCP server. Upon receiving information, at 855, and indicating the location(s) of the location data device(s), a relationship to such location data device(s) may be estimated at 860. Current locality information may be estimated, at 865, based on location information and the relationship to underlying location data device(s).

Figure 8D:
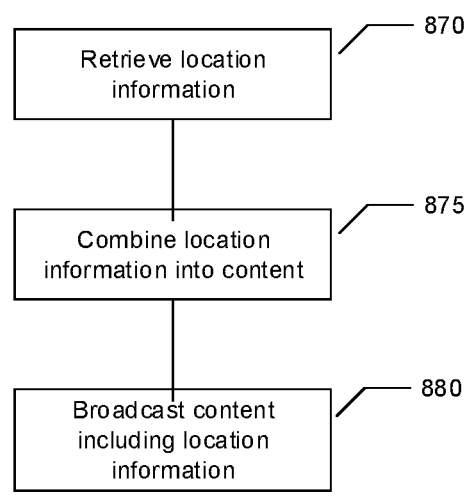

FIG. 8(d) is a flowchart of an exemplary method for providing location information in broadcast information, according to some embodiments. In this example, location information may be retrieved, at 870. An example of retrieving location information is to access location information from memory such as RAM, ROM, EEPROM or magnetic or optical storage. Another example of retrieving location information is to receive location information from a location-aware device such as GPS. Location information may be in any form, including an address, zip code, or coordinates such as latitude and longitude. Location information may be combined into content, at 875. An example of content is a television or radio program. An example of combining location information into content is to include location information in XDS data. Content, including location information, may then be broadcast, at 880.

Figure 8E:
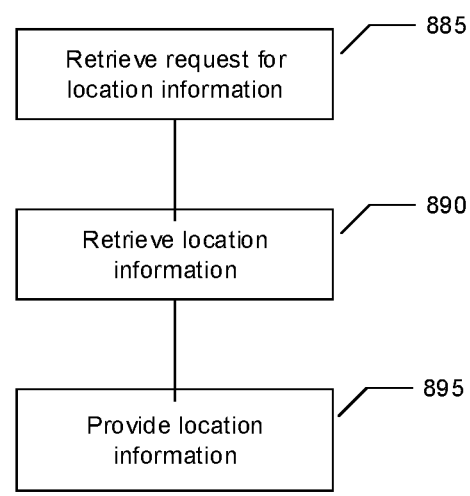

FIG. 8(e) is a flowchart of an exemplary method for providing a location service, according to some embodiments. In this example, a request for location information is received, at 885. A request for location information may be implicit or explicit. An example of a request is a DNS request. Another example of a request is a DHCP request. In some embodiments, a request may be made explicitly, for example using a protocol such as UDP or TCP/IP. Location information may be retrieved, at 890. An example of retrieving location information is to access location information from memory such as RAM, ROM, EEPROM or magnetic or optical storage. Another example of retrieving location information is to receive location information from a location-aware device such as GPS. Location information may be in any form, including an address, zip code, or coordinates such as latitude and longitude. Location information may be provided, at 895. An example of providing location information is to transmit the location information in response to the request received at 885. In some embodiments, location information may be included in response to an implicit request, such as combining location information with a response to a DHCP or DNS request. In some embodiments, location information may be included in a response to an explicit request for location information.

In some embodiments, the method of FIG. 8(e) may be performed by network equipment such as a router or wireless access point. In some embodiments, the method of FIG.

8(*e*) may be performed by a server such as a DNS server, a DHCP server, or a dedicated location information server. In some embodiments, the method of FIG. 8(*e*) may be performed by a data device.

Derived location information may be used for various purposes. One exemplary use is to identify data sources such as channels in broadcasts such as airwave broadcasts or cable broadcasts. In other embodiments, locality information may be used to synchronize state among connected data devices, such as wirelessly connected data devices. For example, one or more base data devices may be initialized with certain customized settings. Additional devices that establish connections within some prescribed locality may derive settings from these base data devices via various discovery methods (e.g. the UPNP approach, to be described later) followed by synchronization with a customized state. Such customized state may be set up based on locality information and may provide information that enables a data device to operate properly within the locality. For example, a customized state may specify locally available broadcast sources, the identity of the cable provider in the locale, receivable channels, reception parameters based on antenna configuration, etc.

A user of a data device that receives or synchronizes with such customized state (to initialize its own state) may further customize the synchronized state. For example, a user may further select specifically which cable provider will be in use or what channels are to be blocked. Selection of lineups may also be automated by scanning channels to see what can be received and examining which lineup is most appropriate. In a different embodiment, the broadcast channels can be scanned not only for presence and absence but also for additional information accompanying a broadcast. The XDS data transmitted with televised broadcasts (as a digital encoding akin to what is used in closed captioning) from a broadcaster is one example of such additional information, which can be used to identify the precise network that is broadcasting on a given channel and to automatically compare and determine plausible lineups to reduce required user interaction in state synchronization.

Referring back to FIG. 7, upon establishing an address of the data device and locality, the data device may announce, at 740, its presence using the address and/or the locality information via some network, which may for example be a local area network or other wired or wireless network. Other data devices may receive such advertised information and use such information in a location-aware application. In this way, other data devices that have need for location information may acquire the same without user intervention. Different types of data devices may be capable of advertising location information, including GPS devices in cars and phone devices that are aware of their area codes. In some embodiments, such advertised location information may be combined with an already-reduced set of channel lineups to further reduce the plausible list of lineups (possibly to a singleton).

Figure 9:
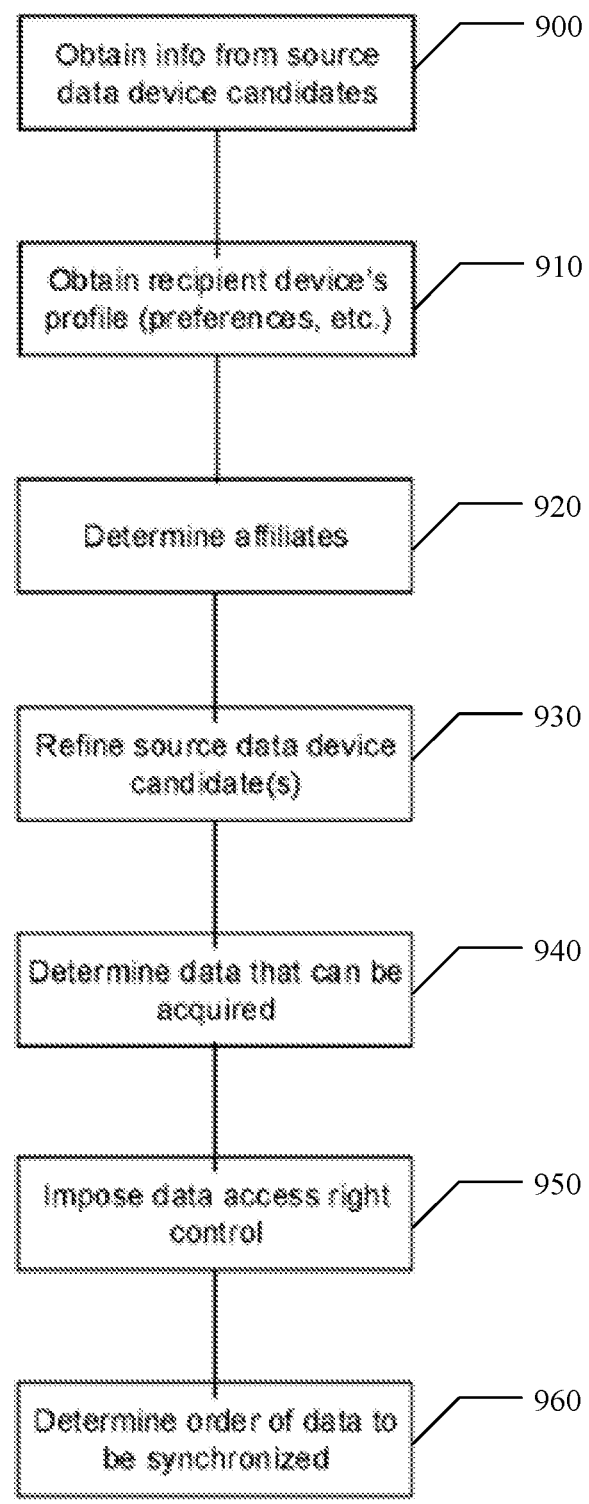
FIG. 9 is a flowchart of an exemplary process, in which data to be synchronized and an acquisition order thereof may be automatically determined, according to some embodiments.

In some embodiments, the data recipient data device may poll, at 740, for the existence of other data devices using, for example, Universal Plug and Play (UPNP). Details related to UPNP are currently available at http://www.upnp.org/download/UPnPDA10_20000613.htm. Alternatively, Apple's Rendezvous technique may also be used to achieve the same goal. Details related to Rendezvous are currently available at http://www.apple.com/macosx/pdf/Panther_Rendezvous_TB_10232003.pdf. Subsequently, one or more data devices that receive the announcement may respond by letting the recipient device know their presence. Such detected data devices may be identified as source or recipient data device candidates with which the recipient data device may synchronize to acquire or provide desired data. Discovered devices may be connected to, at 750, for example to synchronize data. FIG. 9 is a flowchart of an exemplary process, in which data synchronization parameters such as data to be synchronized and an order thereof and the source of the acquisition may be automatically determined, according to some embodiments. In some embodiments, a recipient data device may be engaged in making such determination. In some embodiments, a source data device candidate such as a reachable device may be engaged in such determination. In some embodiments, such determination may be made by a combination of a recipient and a source data device candidate. In some embodiments, one or more third party data devices may additionally or alternatively be used to make such determination. In this example, once a reachable data device has been identified, information related to the reachable data device may be obtained at 900. As discussed earlier with reference to FIG. 6, such information may include an identification of the data device and/or a list of available content. Other exemplary types of information are illustrated with reference to the same figure. In some embodiments, such information may be obtained automatically when a connection is established. For example, an entire list of available content available on a reachable data device may be automatically obtained once a connection is initiated. In other embodiments, information related to the reachable data device may be opportunistically acquired. In this situation, obtaining such information may be automatically resumed when an intermittent connectivity is re-established.

Profile information associated with a recipient data device may also be obtained at 910. Such profile information may contain, as discussed earlier with reference to FIG. 5, preferences related to desired content (e.g. preferred programs), acquisition requirements, etc. Such preference information may be used to match with the information received from other reachable data devices to determine, for example, one or more source data devices from which desirable data is to be acquired, the manner in which desirable data is to be acquired (e.g. serial or parallel acquisition mode), acquisition parameters (e.g. frame rate, resolution, sound quality, etc.), timing of the acquisition with respect to each source data device, etc.

Program preference information may correspond to a preference list or a wish list with individual preferred items listed, each of which may optionally be associated with a score, indicating a degree of desirability or how important the item is. A preference score may be manually assigned by a user, semi-automatically obtained based on some user inputs (e.g. ratings of similar programs), or automatically derived using information based on, e.g., a user's viewing habits, as described earlier with reference to FIG. 5. In this example, a higher preference score may indicate a higher desirability. Therefore, such a preference list may be used to determine the data to be acquired subject to resource constraints such as storage space. The preference list may be sorted according to some criteria such as the value of the scores in a certain order, e.g. a descending order. Such a sorted list may serve as a priority list, for example indicating an order in which each piece of the desired content is to be acquired. This ordered list may also be used to decide, for example, which of the desired content is to be acquired if it is not possible to acquire data corresponding to all the items on the list (e.g. if there is not enough storage to acquire all the items).

In some embodiments, upon receiving information related to a reachable data device, affiliations may be optionally determined, at 920. In some embodiments, affiliations may be determined in a transitive manner, for example by identifying affiliations with data devices that are affiliated with affiliated devices. Such transitive determination may for example start with a reachable data device (if affiliated). An affiliated data device refers herein to a data device in a set of devices that has been designated to exchange data, such as multimedia content, or to share resources such as tuners and storage buffers, with one or more other devices. Affiliates of a data device may be specified, for example, through a direct user interface connected to a device. In some embodiments, affiliate information may be configured through an automatic means such as acquiring a default setting when a data device is initially turned on, for example wherein the default setting is to acquire a list of reachable devices (i.e., in a household) and associate with them as affiliates. A data device may also form an affiliation relationship temporarily with another data device. One example of such a temporarily affiliated data device is a data device associated with a video rental store or a music rental store, for example, reachable through a wireless network such as an 802.11 network. Temporary affiliation with another data device that is not explicitly affiliated may be controlled by some security policies. For example, an affiliation security policy may permit a temporary affiliation with a data device only when a trusted authority certifies the data device. Another exemplary affiliation security policy may allow temporary affiliation with a data device when the data device possesses sufficient ID information about the affiliating data device's owner, such as a name, account number, or credit card number.

Whether to explore further affiliations other than the reachable data devices may be adaptively determined according to dynamic situations. For example, if some of the content desired by a recipient data device is not available according to a list of content available on a reachable data device, then the recipient data device may decide to contact data devices affiliated with the reachable data device to determine whether such content is available from those affiliated devices. As another example, if there is no available resource on a reachable data device to facilitate acquisition of desired content within a desired time frame (e.g. all resources have been reserved for other purposes during the desired time frame), then the recipient data device may contact other affiliated data devices to identify needed resources to facilitate the acquisition. In some embodiments, a recipient data device may contact data devices that are affiliated with the initially reachable data devices.

In some embodiments, affiliations may be acquired from affiliated data devices and may be used transitively to form broader affiliations. For example, a data device may automatically grow its affiliates list by adding affiliate lists acquired from previous affiliates. For example, if A is affiliated with B, and B is affiliated with A, herein referred to as A and B being mutually affiliated, then B might supply a list of affiliates to A. If B and C were already mutually affiliated, then B's affiliate list would include C as well as A. After A and/or C have acquired B's affiliate list, they may automatically establish a mutual affiliation. In one example of acquiring B's affiliate list, both A and C may acquire the list and confirm that the other is contained therein. In another example of acquiring B's affiliate list, A may acquire B's affiliate list and contact C with a credential demonstrating affiliation with B. One example of a credential is a cryptographically signed affiliation certificate, for example a certificate signed using a public key associated with B.

In some embodiments, data devices may automatically attempt to acquire data from one or more affiliated data devices. In situations where a data device acquires data from more than one data device, such acquisition may be serial or parallel. In serial acquisition mode, data may be acquired from directly affiliated data device(s) or indirectly from other data devices that are connected to the direct affiliates. In some embodiments, one or more data devices may store data from an affiliated data device (possibly along with information about the source of the data) and then forward the data, optionally with attribution, to other affiliated data devices. Such indirect acquisition may make use of a connectivity tree or a collection of subtrees thereof to store and forward data so that data (e.g. lists of content) may be propagated throughout a network of affiliated data devices. In a parallel acquisition mode, a data device may attempt to make a direct connection to affiliated data devices, whether affiliated directly or transitively, and acquire data directly via these connections. In some embodiments, data synchronization may be performed in a mixed mode in which both serial and parallel connections exist. For example, a recipient data device may connect to more than one direct source data devices, some of which may obtain pieces of synchronized data from other data devices.

An initially identified reachable data device may not necessarily become a source data device from which the recipient data device acquires data. Instead, such an initially reachable data device may serve as a conduit to direct the recipient data device to other data devices through affiliation to identify appropriate source data devices. This process may continue along a chain of affiliation until appropriate source data device(s) are identified for synchronization purposes. This is refinement of source data device candidates, as performed at 920.

In some embodiments, a recipient data device may refine, at 930, source data device candidates based on other types of the received information related to a reachable data device. For example, it may contact a second data device as its affiliate or a source data device candidate that is identified as a potential source of some desirable content according to a list of content sources received from a reachable data device. Alternatively, a recipient data device may act on a list of available delivery channels received from a reachable data device and contact a second data device as a new potential source data device candidate that has access to one or more of the available delivery channels given a known locality. In some embodiments, a recipient data device may contact a second data device to reserve a resource. An example of a resource that may be reserved is a resource that can assist in acquiring desired data satisfying a content acquisition schedule, such as a tuner. In some embodiments, a content acquisition schedule may be derived based on content availability information received from another data device.

The recipient data device's profile information may be matched against information related to the refined source data device candidate(s) to determine, at 940, data that may be acquired, which may optionally be subject to certain constraints such as resource limitations. In some embodiments, the recipient data device's preference as to content may correspond to an acquisition policy of acquiring all data that is currently not on the recipient data device. In this example, the data to be acquired is an aggregation of all the content that the source data device candidate(s) can offer. In other embodiments, what can be acquired may be subject to certain limitations such as availability of resources (e.g. storage space on the recipient data device). In some embodiments, the content items on a preference list may be a subset of what can be acquired from the source data device candidates (e.g. what the source data devices are able to supply is more than what the desired content includes according to the preference list). Alternatively, the lists of content from all identified source data device candidates may constitute a subset of what is desired according to the recipient data device's preference list (e.g. the source data devices can only offer a portion of what is on the preference list). In some embodiments, although source data devices are able to supply content that is on a preference list, an acquisition policy may prohibit certain content from being acquired onto the recipient data device. In these situations, the data to be acquired may be restricted to the intersection of what is permitted to be acquired and what can be offered.

Data to be acquired based on matches between a preference list and list(s) of available content may be subject to other limitations. For example, data access right control may be imposed, at 950, as an additional constraint. As discussed earlier, an acquisition policy residing on a recipient data device may also govern what data may be acquired. For example, when a preference list is an aggregated preference list, e.g. generated across a group of individual users of either a single data device (e.g. all the users of a single multimedia player in a household) or a plurality of data devices (e.g. all the data devices in a household or all the devices in a neighborhood where each household in each family may have more than one user), the data to be acquired based on such an aggregated preference list corresponds to aggregated desired content. In some situations, it may be set up in such a manner that only a base data device in an aggregated group may be allowed to acquire aggregated desired content based on an aggregated preference list of the group and then other data devices in the same group may synchronize with such a base data device to acquire its desired data, which may be subject to certain acquisition or data access control imposed on that device. In other situations, each of the data devices in a group may be allowed to individually acquire aggregated desired data from devices outside of the group based on the aggregated preference list, and such acquisition may be subject to acquisition control imposed on the acquiring data device. For example, a data device used by a minor in a household may acquire data, for example with a fee, from a data device in a video rental store but such acquisition may be subject to a parental control policy imposed on the minor's data device that allows the minor to acquire only children's programs. Another example of data access right control is when data requires a license or purchase, for example copyrighted work protected by a digital rights management scheme. In this example, controlled content may be acquired in some embodiments when the would-be acquirer provides proof of acquisition rights, for example a cryptographically signed certificate or a payment voucher.

Data access right control may be imposed either prior to or after the determination of data to be acquired, for example based on a match between a preference list and available content list(s). Data access right control, if imposed after the matching, may yield a revised determination of data to be acquired. Some of the data determined to be acquired based on a preference list may be disallowed due to access right control. In some situations, imposition of access right control may not alter the result from the matching. In some embodiments, data access control may also be imposed at the same time that the preference list is matched against list(s) of available content.

Based on the result as to the data to be acquired, the recipient data device may further automatically determine, at 960, an order in which the data is to be acquired. Such an order may be determined based on different criteria. In some embodiments, the order may be determined according to the size of each piece of data to be acquired. For instance, the largest piece may be acquired first and the smallest piece may be acquired last, or vice versa. Alternatively, the order may be determined according to scheduled availability of resources (e.g. tuners) on the source data devices that are needed for data acquisition. For instance, pieces of data from a source data device whose tuner will be available the first may be acquired first. Another alternative is that the order is based on the degree of desirability of each piece of data, determined, for example, according to their preference scores (as discussed earlier).

In some embodiments, other parameters associated with data acquisition may be determined based on the decisions on data to be acquired and an order thereof. For example, operational parameter settings on the involved data devices (both recipient and source data devices) may be set in a way that facilitates acquisition of the desired data in the order determined. For example, if desired data is to be acquired from multiple sources in a particular order, an order in which the recipient data device communicates with different source data devices to acquire different pieces of the desired data may be accordingly determined. As another example, depending on quality requirement as to the desired data (e.g. frame rate of a video), operational parameters on both the source and the recipient data devices may be set to facilitate data synchronization to ensure the required quality.

Figure 10:
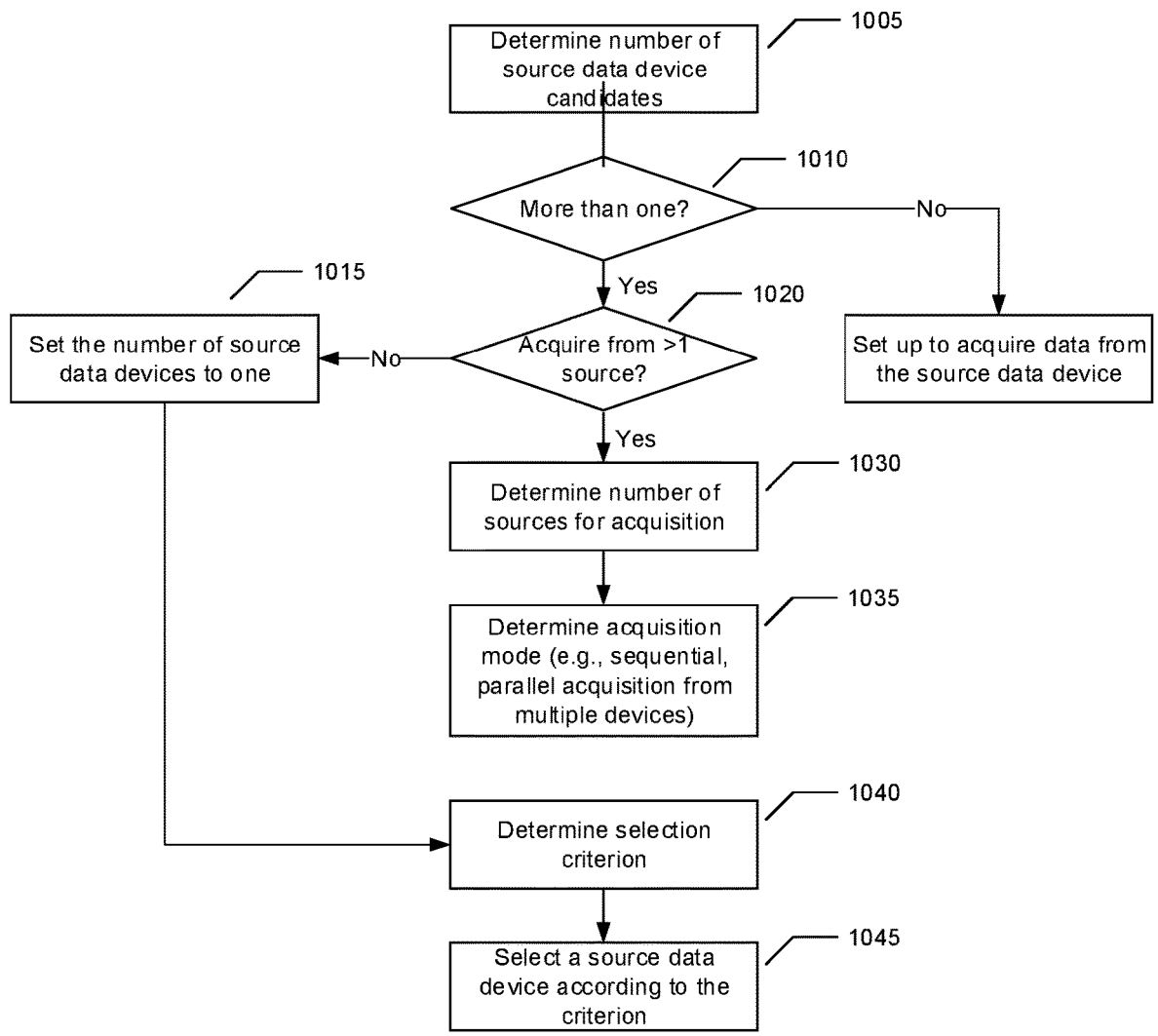
FIG. 10 is a flowchart of an exemplary process, in which one or more source data devices are automatically selected for synchronization, according to some embodiments.

FIG. 10 is a flowchart of an exemplary process, in which one or more source data devices are automatically selected for synchronization among data devices, according to some embodiments. In this example, selecting source data devices may be an optional operation during synchronization of content. One example of a situation in which selecting source data devices may be omitted is when there is only one source data device candidate. In the exemplary flow as described in FIG. 10, the number of source data device(s) is determined, at 1005. If there is not more than one source data device, determined at 1010, it proceeds with setting up, at 1025, to perform synchronization of desired content between the recipient data device and the sole source data device.

If there is more than one source data device candidate, it is further determined, at 1020, whether more than one source data device is to be used to acquire desired data. Such a decision may be determined based on different considerations. In some embodiments, the decision may be related to a time limit within which the desired data is to be acquired and/or what the recipient data device is capable of supporting. If it is determined that only one source data device is to be used for synchronizing desired data, the recipient data device may optionally set, at 1015, the operating parameter to acquire the desired data from a single source data device. When there is more than one source data device candidate, the recipient data device may select one of the source device candidates based on one or more criteria.

Criteria associated with making such a selection may be determined at 1040. Such selection criteria may be pre-defined, pre-stored, and retrieved when needed. For example, a pre-defined source data device selection criterion may instruct the recipient device to select a source data device that provides the fastest speed, or may favor specific devices, or may scoreboard based on multiple criteria. Based on one or more selection criteria, a source data device may be selected at 1045.

Figure 11:
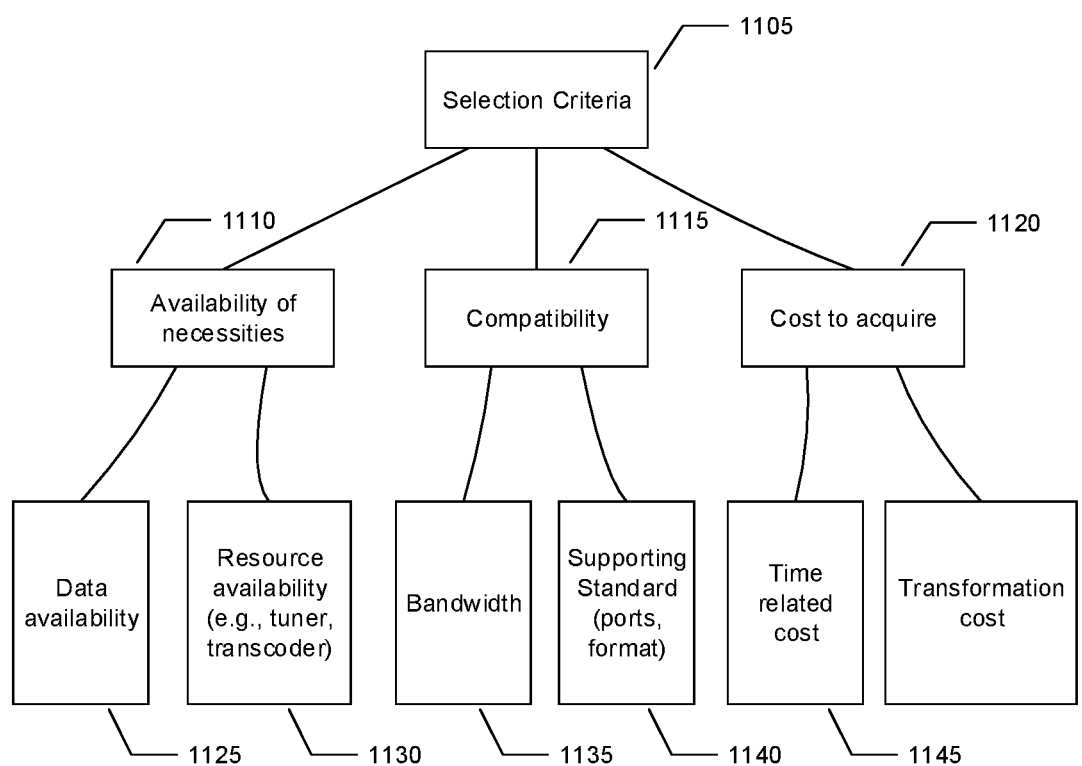
FIG. 11 shows exemplary types of criteria for selecting source data devices for synchronization, according to some embodiments.

There may be other considerations in defining a source data device selection criterion. FIG. 11 shows exemplary types of considerations for selecting a source data device, according to some embodiments. In this example, one or more source data device selection criteria (1105) may be based on, for instance, the availability of necessary resources (1110), compatibility between the recipient device and a source device 1115, or other factors such as the cost (1120) associated with using a source data device to acquire data. Necessary resources 1110 may include availability of desired data (1125), for example whether data desired is available on a source data device (which is discussed earlier with reference to FIG. 9) or availability of other resources (1130) on the source data device that may be used to facilitate the acquisition (e.g. tuner, transcoder, etc.). Compatibility between the recipient data device and a source data device may also play a role in the selection. For instance, bandwidth compatibility (1135) and standards supported (1140) on a source data device may have to be compatible with what the recipient data device is capable of handling. Cost may be another concern in selecting a source data device. For example, a recipient data device may wish to receive content in a video rental store and the desired content may be available from a plurality of source devices in the store, with each source data device capable of transmitting the desired content in different formats and charging different transformation prices (1150). Assuming the recipient data device may be able to handle all the formats offered, it may select a source data device that offers an acceptable price. Similarly, different source data devices may transmit data at different speeds with different cost (1145). In this example, the recipient data device may automatically select a source data device for acquisition that transmits data in a tolerable length of time with an acceptable cost for the transmission.

If it is determined that more than one source data device will be used to perform synchronization of desired data, it may be further determined, at 1030, the number of source data devices to be used for acquiring the desired data. Operational parameters of each of the source data devices during acquisition, e.g. the acquisition mode of the acquisition (e.g. serial acquisition or parallel acquisition) or scheduling of each of the multiple source data devices during the acquisition (e.g. timing, bandwidth, etc.) may be further determined, at 1035.

Decisions related to both the number of source data devices to be used and how to schedule those source data devices may be made based on different considerations. For example, the number of receiving ports available on the recipient data device may restrict how many source devices the recipient data device can communicate with simultaneously. In addition, the bandwidth capacity of the recipient device may be used to select source device candidates. For example, a device with relatively limited inbound bandwidth would not benefit from having a multitude of high bandwidth sources. Furthermore, timing-related preferences regarding the desired data may be relevant in determining whether the desired data should be acquired in parallel from a certain number of source data devices and if so, at what speed from each source data device. As an example of a timing-related preference, it may be preferred to obtain content sooner, and available sources may have relatively low sourcing bandwidth when compared with the recipient data device's inbound bandwidth. In such an example, a parallel acquisition from numerous sources may best satisfy the preference. In some embodiments, a device may make such decisions locally, for example by running applications deployed for making such decisions. In some embodiments, a different data device may be involved in making such decisions. For instance, a base data device in a household may have such capability and\other data devices connecting to it may rely on the base device to make such decisions. In some embodiments, those decisions may be made in a distributed manner, e.g. some made locally, some by a base device, and some by one or more peer devices.

In some embodiments, decisions made at 1030 and/or 1035 may be made via a rule based approach. In other embodiments, an ad hoc approach may be deployed to govern the scheduling. Decisions may be made according to what is available and what is needed. In some embodiments, the desired data may have to be acquired from more than one source data device, for example because some desired item may be divided among more than one source data devices. To obtain the item, the acquisition may be performed in different modes, e.g. either serially or in parallel. In some embodiments, for example to meet a timing requirement, an original source data device may supply a copy of a piece of a desired item to another source data device so that both source data devices may transmit different portions of the desired item in parallel to the recipient data device.

In some embodiments, decision making at 1030 and 1035 may be formulated simultaneously as a resource scheduling problem and may be solved using optimization techniques known in the art. For example, operations research techniques may be deployed, wherein specific formulations may be established by simultaneously considering different variables involved in scheduling available resources to meet known delivery requirements. Exemplary variables to be considered in such optimization include a given number of available resources, operational parameters of each given resource, the data items desired, and individual requirements related to delivery of each item. Optimization frameworks such as linear or dynamic programming may be utilized to solve the problem. In formulating such problems and solutions, some of the variables or parameters may be subject to constraints. One illustration of such a scenario may be that a resource may be operated within a given range of parameters. For example, a source data device may be capable of handling a data stream with a bandwidth requirement between 160 Kb/second and 1 Mb/second or the time frame to acquire a desired data item may be between 2:00 pm to 6:00 pm. In some embodiments, one or more such variables may be subject to constraints with fuzzy boundaries. For instance, a variable indicating desired quality of acquired data may be subject to the constraint of being within the range of being "medium" and "high" quality. In this case, the specific numerical range for both the upper and lower bounds of the required acquisition quality are subject to computation against fuzzy membership functions, which may be pre-established or dynamically updated.

Figure 12:
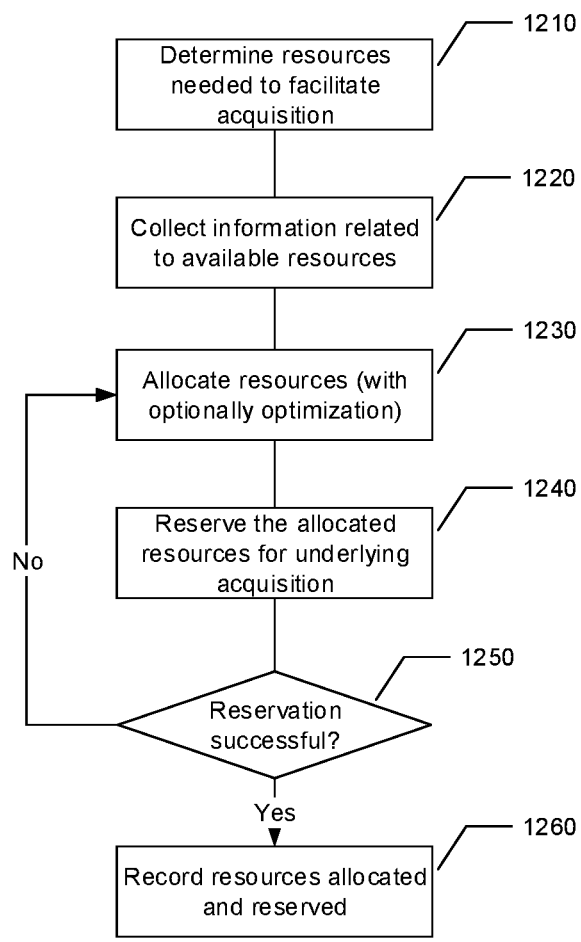
FIG. 12 is a flowchart of an exemplary process, in which resources required to perform synchronization are allocated and reserved according to some embodiments.

FIG. 12 is a flowchart of an exemplary process, in which resources used for synchronization are automatically allocated and reserved according to some embodiments. In this example, although the availability of resources may have been taken into account during selecting source data devices (e.g. ensured that required resources are available from the selected source data devices), specific resources used in carrying out the acquisition may still need to be individually identified. Exemplary types of resources that enable acquisition include a tuner, a transcoder, a port, etc. Resources required for acquiring desired data may be allocated across different data devices. For instance, if desired data from a first source data device supplying the desired data needs to be transcoded and the first source data device does not have the required transcoder available at the time of the acquisition, a transcoder in a second source data device may be identified to facilitate the acquisition. In this case, the transcoder in the second source data device may be allocated and reserved prior to the acquisition and if successfully reserved, the first source data device may, during the acquisition, transmit the desired data in its un-transcoded form to the second source data device, which may subsequently transcode the desired data and transmit the desired data in its transcoded form to the recipient data device.

In FIG. 12, resources needed to facilitate acquisition of desired data may be determined at 1210. Information about resources available among source data device(s) may also be collected at 1220. This may include which source data device(s) has what resource(s). Certain available resource(s) in at least some of the source data device(s) may be allocated, at 1230, according to, for example, acquisition requirements. There may be more than one way to allocate the available resources (e.g. there may be more available resources than required) and some optimization may be optionally applied to the allocation process (at 1230). For example, when multiple tuners are available, a tuner that has a newest registration number (e.g. installed most recently) may be allocated. Allocated resources may also be optionally reserved, at 1240, according to allocation, to ensure their availability. If reservation for a particular resource fails, as determined at 1250, the resource for which the reservation fails may now be considered as no longer available. In this case, reallocation may be performed at 1230, for example by repeating the allocation/reservation process without considering the resource for which the reservation failed. When all the resources needed are successfully reserved, as determined at 1250, the allocation and reservation may optionally be recorded at 1260. Resources allocated for acquisition may be located in the recipient data device and/or in one or more source data devices. For example, a transcoder used in acquisition may reside in either the recipient data device or one of the source data devices. In some embodiments, reservation of some or all resources may be implicit. For example, a reservation for a tuner may be explicit, while a reservation for a transcoder operating on a recipient device may be implicit.

Figure 13:
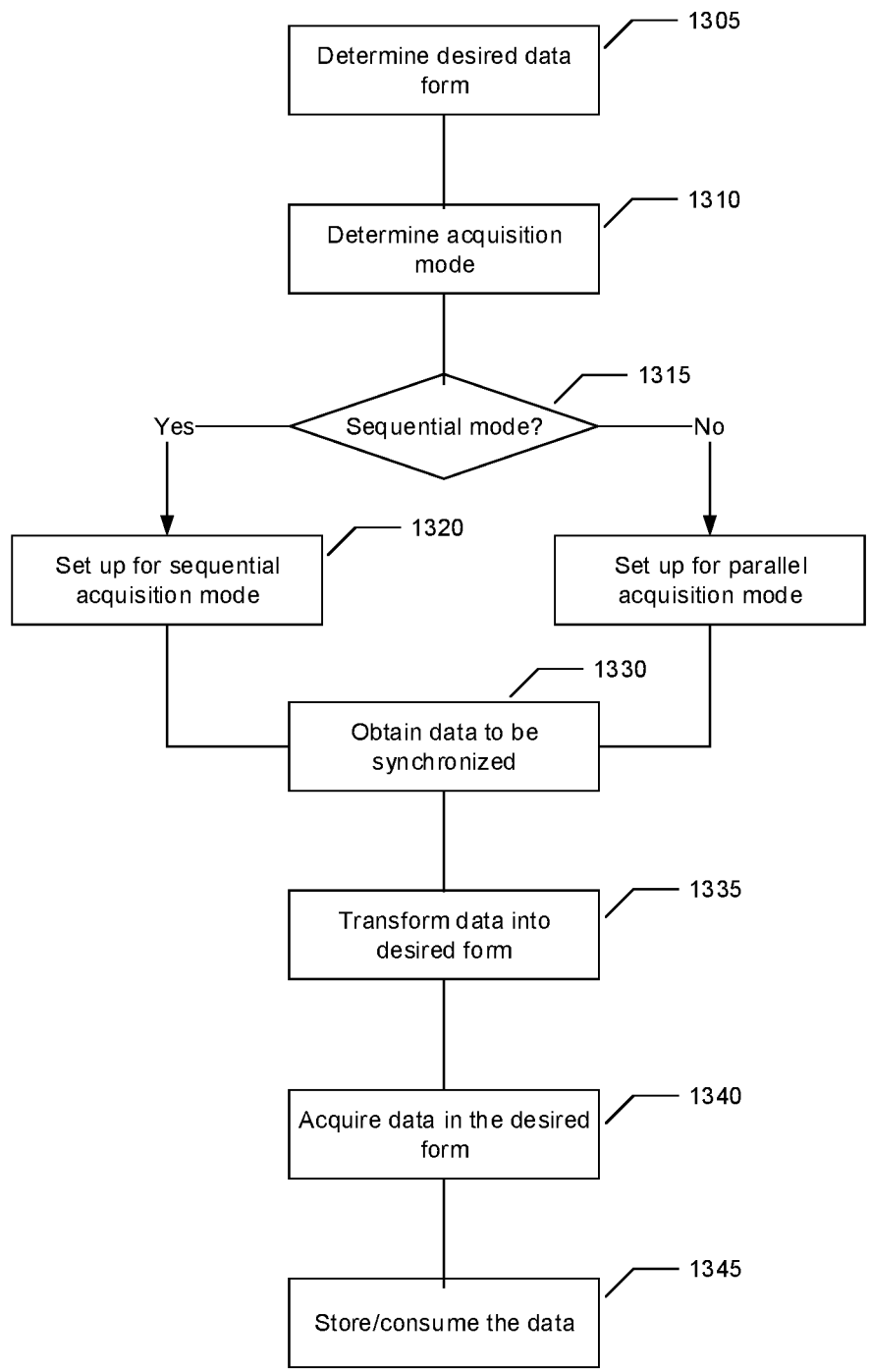
FIG. 13 is a flowchart of an exemplary process, in which desired data is acquired from one or more source data devices, according to some embodiments.

FIG. 13 is a flowchart of an exemplary process, in which desired data is obtained from one or more source data devices, according to some embodiments. In this example, desired data may be obtained in different operational modes. For example, it may be from a single data source or from multiple data sources. When multiple sources are involved, the acquisition from those sources may be performed in serial or in parallel. In addition, the obtained data may be transcoded to a particular standard (e.g. JPEG, MP3, Real Video, WMA, MJPEG, WMV, MPEG-x, or H.263), encrypted, transcoded to a specific frame rate (e.g. 20 frames/second), or resampled to a particular resolution (e.g. 352 by 288 pixels per frame). In some embodiments, such operations may be applied automatically, for example as directed by configuration parameters. In FIG. 13, the desired data format may be determined at 1305. Reformatting may trigger initialization of certain reserved resources such as a transcoder to prepare for the acquisition. Similarly, the acquisition mode may be determined at 1310, 1315. Depending on the acquisition mode, the source data devices may be initialized at different times. For example, if the acquisition is to be in a serial mode, only the source data device(s) that are to transmit the portion of the desired data that is being acquired at the time may be initialized at 1320. If the acquisition is to be carried out in a parallel mode, all source data devices supplying corresponding portions of the desired data may be initialized at 1325. In some embodiments, a mixed mode may be in effect. For example, there may be a series of acquisitions, some or all of which may involve multiple source data devices supplying portions of the desired data in parallel.

Once the source data devices are initialized, portion(s) of the desired data may be obtained at 1330. This may involve retrieval of some data on each source data device from data storage. In other embodiments, a source data device may set up its tuner to acquire data from some other sources, e.g. a broadcast channel. After the desired data is obtained, such data may be transformed from its current form into a desired form. For example, data obtained by a source data device in its current form may correspond to analog signals (e.g. from an airwave broadcast) and the desired form may be digital form. In this case, the analog data may be transformed into a digital form. Transformation may be performed at 1335. Depending on where the resource(s) reserved to perform such transformation resides, the source data device may or may not carry out the transformation itself. For example, such a source data device may transmit the data in a form to a data device where a transformation may be carried out on data using a transcoder reserved on that data device. In another example, a transformation may be performed on a recipient data device. In another example, a transformation may be carried out on a third party data device.

The data in its transformed form may then be acquired at 1340. If the recipient data device carries out the transformation, this may correspond to producing the desired data in its desired form. If transcoding is to be carried out by a device other than the recipient data device, this may correspond to receiving, by the recipient data device, the transformed data from another device. Upon acquiring the desired data in its desired form, the recipient data device may, optionally, store, at 1345, the desired data locally. Alternatively, the recipient data device may consume the desired data, for example by streaming a presentation of the data with an optional temporary buffer. In other embodiments, a recipient data device may consume and store the desired data.

Figure 14:
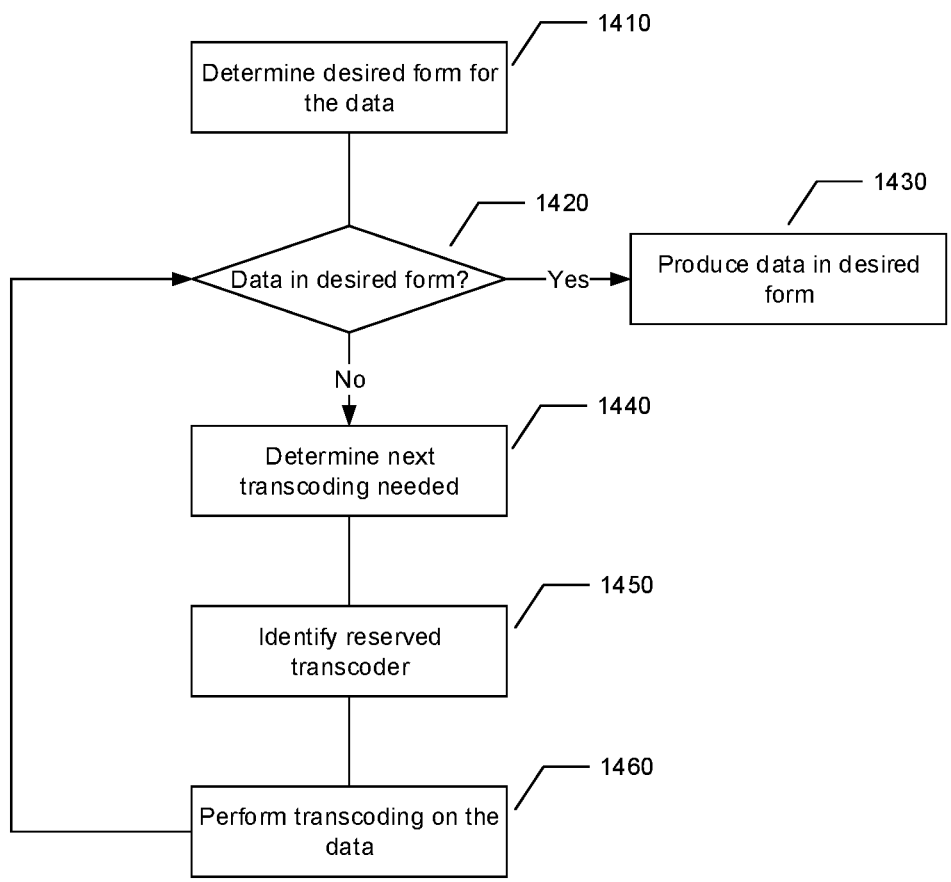
FIG. 14 is a flowchart of an exemplary process, in which data synchronized among different data devices is transcoded according to some embodiments.

FIG. 14 is a flowchart of an exemplary process, in which data synchronized among different data devices is transformed. In this example, a desired data format is determined at 1410. If the data obtained at 1330 is already in the desired format at 1420, the obtained data is produced as the desired data at 1430. Otherwise, transcoding is performed in this example, which may involve one or more steps of transformations. At each transformation step, a next necessary transformation may be determined at 1440. A transcoder reserved for carrying out the next transformation may be identified at 1450. Such a reserved transcoder may reside on the recipient data device, one or more of the source data devices, or an intermediate device. The next transformation is performed on the desired data in its current form (which may be in an intermediate form) at 1460. This may involve multiple operations. For example, this may cause data to be transformed to be transmitted from one data device to another data device where the transcoder reserved for this particular transformation resides, receiving such transmitted data, and applying the transcoder to the data upon receiving it. After each step of transformation, the desired data in its next form is produced and the process repeats from 1420 to 1460 until the produced data is in the desired form. In some embodiments, the method of FIG. 14 may be applied to an entire piece of content in sequence. In some embodiments, the method of FIG. 14 may be applied in a streaming fashion, for example by determining the necessary transcoder(s) and passing data through them as data is acquired from one or more source data devices. In some embodiments, different stages of data transcoding from a source format to a target format may be performed on different data devices, including for example simultaneously performing transforms on different data devices.

Figure 15:
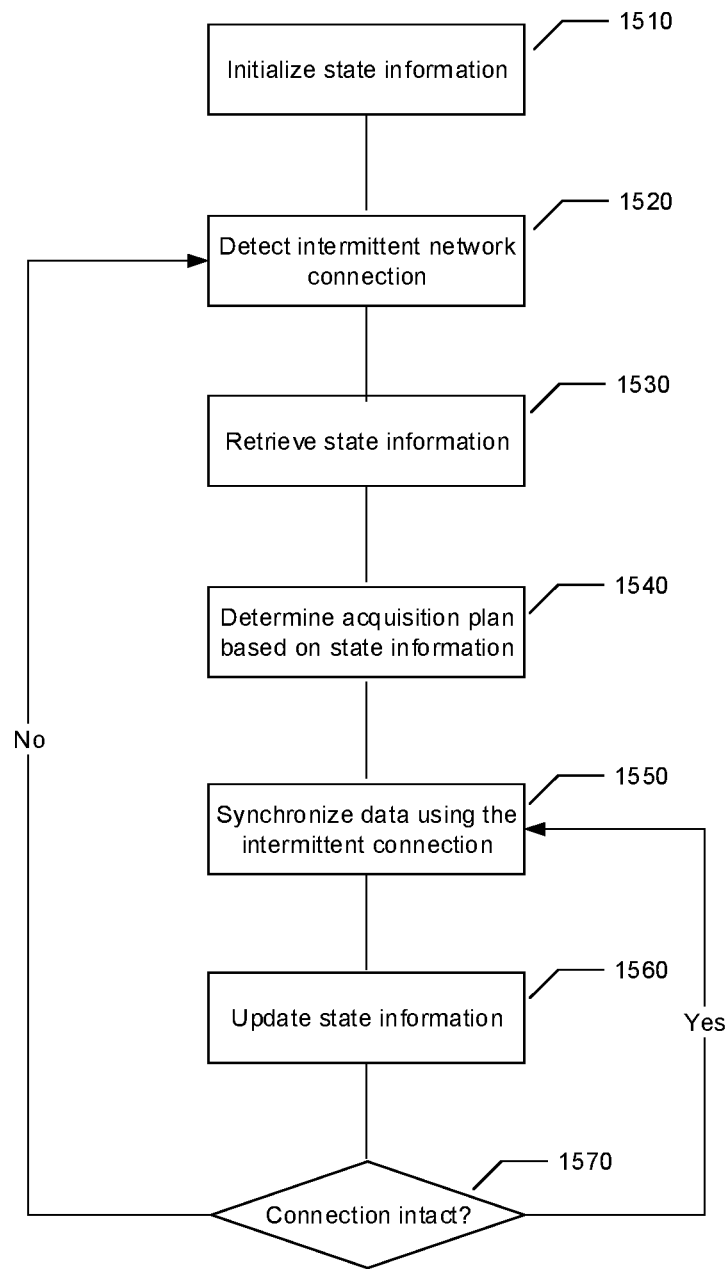
FIG. 15 is a flowchart of an exemplary process, in which data synchronized among different data devices is acquired in an opportunistic mode via intermittent network connections, according to some embodiments.

FIG. 15 is a flowchart of an exemplary process, in which desired data may be synchronized between a recipient data device and one or more source data devices in an opportunistic mode via intermittent network connections, according to some embodiments. In this example, the desired data may be acquired in an opportunistic fashion. During opportunistic acquisition, the desired data may be acquired in more than one discontinuous or intermittent network connection sessions. To facilitate such opportunistic acquisition operation, state information (as described with reference to FIG. 6) indicating a dynamic acquisition status may be retrieved at the beginning of an acquisition session so that the acquisition may be resumed properly and may be updated (e.g. stored) at the end of each such session to facilitate a proper resumption of the next session.

In FIG. 15, state information may be initialized at 1510. Such state information may indicate an initial position, such as byte offset, block number, temporal cursor, etc. where the acquisition may continue in the next intermittent network connection session. Other types of information may also be included in the state information. For example, information related to one or more source data devices, a mapping indicating which pieces of the desired data are to be acquired from which source data devices, transformation(s) to be performed, resource allocation/reservation information, and current acquisition status such as the starting point for each piece of the desired data from a corresponding source data device, etc.

An intermittent network connection may be detected at 1520. Upon detection of a network connection, data synchronization may be resumed. To do so, state information may be retrieved at 1530. State information may include details related to the current status. An example of details related to the current status includes information about each piece of the desired content such as how much is remaining with respect to each piece of the content from a source data device. For example, if part of a piece of content has been synchronized in previous sessions, the synchronization during the current session may continue from where it left off without retransmission of previously received segment(s). This resumption may, for example, be implemented by having a recipient data device specify a content identifier along with a byte offset from where the transmission is to be continued, along with an optional length. In this case, a corresponding supplying source data device may then respond with a selected portion of the content.

Such resumptions may optionally acquire multiple portions, either serially or in parallel, from one or more corresponding supplying data devices. The recipient data device may, for example, be incrementally storing recorded content as it arrives and may use the length of the partially stored content as the byte offset to resume transmission. Alternatively, either a source data device or a recipient data device may supply hash(es), such as a CRC32, SHA1 or MD5 of portion(s) of a file containing the content. If a mismatch in a hash between received and available content is detected, then either the resumption may be terminated and transmission may optionally be restarted from the start of the content (rather than resuming) or the transmission may be resumed from one or more alternate source data devices.

In certain situations, when an intermittent connection is detected, the synchronization may be disrupted due to various reasons. For example, a source data device may have deleted or lost some of the content scheduled to be transmitted to a recipient data device after the previous connection session. Another disruption example may be that a resource reserved for a particular purpose (e.g. a tuner) may be malfunctioning. An acquisition plan may be regenerated based on retrieved state information and the current operational status of the involved data devices. This is performed at 1540. In some embodiments, a recipient data device may generate a revised acquisition plan by abandoning the portion(s) of the desired data when they have become unavailable. For instance, if one of the source data devices no longer has a particular program desired, the recipient data device may remove details (e.g. the source for the program, acquisition parameters, resources reserved for that acquisition, etc.) in the previous acquisition plan that are related to acquiring that particular program. In other embodiments, a revised acquisition plan to acquire the desired data through alternative means may be derived, for example based on currently available resources. In other embodiments, a recipient data device may attempt to derive an alternative acquisition plan and may abandon a portion of the acquisition when that portion of the acquisition cannot be completed.

To derive an alternative acquisition plan without sacrificing desired content, several of the above discussed decision making processes in various procedures may be applied. For example, identification of more (new) source data devices, re-determination of revised acquisition mode, or re-allocation and reservation of currently available resources may be carried out. In some embodiments, it may also involve performing additional operations such as sending a request to an existing source data device that has lost a portion of the desired data to re-acquire such data.

With an update acquisition plan obtained at 1540, the synchronization may proceed according to the new acquisition plan at 1550 via the detected intermittent network connection. During the opportunistic acquisition, state information may be updated, for example according to some pre-determined schedule. In some embodiments, the update may occur at the recipient data device side. In some embodiments, state information on the source data device side may be updated. In those situations, when the intermittent network connection is detected, the recipient and its source data devices may re-synchronize state information so that the synchronized state information may be used to derive a revised acquisition plan. In other embodiments, the state information on both the recipient and the source data devices may be updated during opportunistic acquisition. In this case, synchronization may be performed both prior to updating the state information on each data device during the acquisition and after the intermittent network connection is detected to ensure consistency of the state information from different data devices (e.g. the last update during the previous acquisition session may be inconsistent across different devices).

In some embodiments, an update may be scheduled regularly according to a pre-specified time interval. For instance, such update may be scheduled to occur every 3 seconds on each device. In some embodiments, an update may be triggered dynamically whenever some conditions are met. For example, it may be configured so an update to state information may occur only when some network measure, e.g. latency, exceeds a certain threshold. The update may also be scheduled according to certain measures related to data acquisition itself. For example, the state information may be updated whenever the recipient data device has received another fixed amount of the desired data. A recipient data device may send a signal to a connected data device whenever such a condition is satisfied. The opportunistic acquisition operation may continue as long as the network connection is still intact, as determined at 1570. When the intermittent network connection is disrupted, the process returns to 1520 to detect another intermittent network connection.

Data of different types (content, profile, state information, etc.) may be synchronized among different data devices through acquisition as described above. Data of different types may also be synchronized through replication. For example, content on a data device, either acquired via synchronization as described above or obtained through other means (e.g. intercepted from airwave broadcast or downloaded from the Internet), may be replicated onto other data devices to achieve synchronization. In this form of synchronization, a data device may seek other data devices and to request such other data devices to replicate one or more copies of its data.

Synchronization through replication can be applied in different scenarios. For example, a base data device in a household may acquire desired content (e.g. determined using a preference list aggregated across all data devices in the same household) by synchronizing with one or more data devices outside the household (e.g. the data devices in a video rental store or in a friend's home), or by recording one or more broadcasts. To allow other family members to use the same content on their own data devices, the base data device may subsequently perform internal synchronization with all the data devices of the same household by replicating the content acquired from outside onto such internal data devices.

In synchronization via acquisition, a recipient data device may select desired content, determined based on its preference list, from one or more source data devices. This may be a mapping from many (source data devices) to one (recipient device). Synchronization via replication may correspond to a mapping from one (source data mapping) to one or many (recipient data devices). Although the mapping configuration in synchronization via replication may be different, the underlying synchronization may also be performed based on preferences. For example, the data to be replicated may be selectively replicated into different recipient devices according to their individual preferences. That is, the synchronization via replication may also be individualized according to the preferences of the receiving end. In some embodiments, data to be replicated onto a recipient data device may be subject to data access control on the recipient data device, for example in the same manner as in synchronization via acquisition (described above).

Synchronization via replication may be performed in different operational modes. For example, each piece of the content to be replicated may be copied to one or more devices, in which case each device may have a full copy of the same content. Alternatively, each piece of content (e.g. a movie) may be replicated onto multiple data devices in a distributed manner so that each data device has a portion of the replicated content. Data replication across a plurality of data devices may be achieved within an affiliated group, formed either on a temporary basis or on a more permanent basis.

Figure 16:
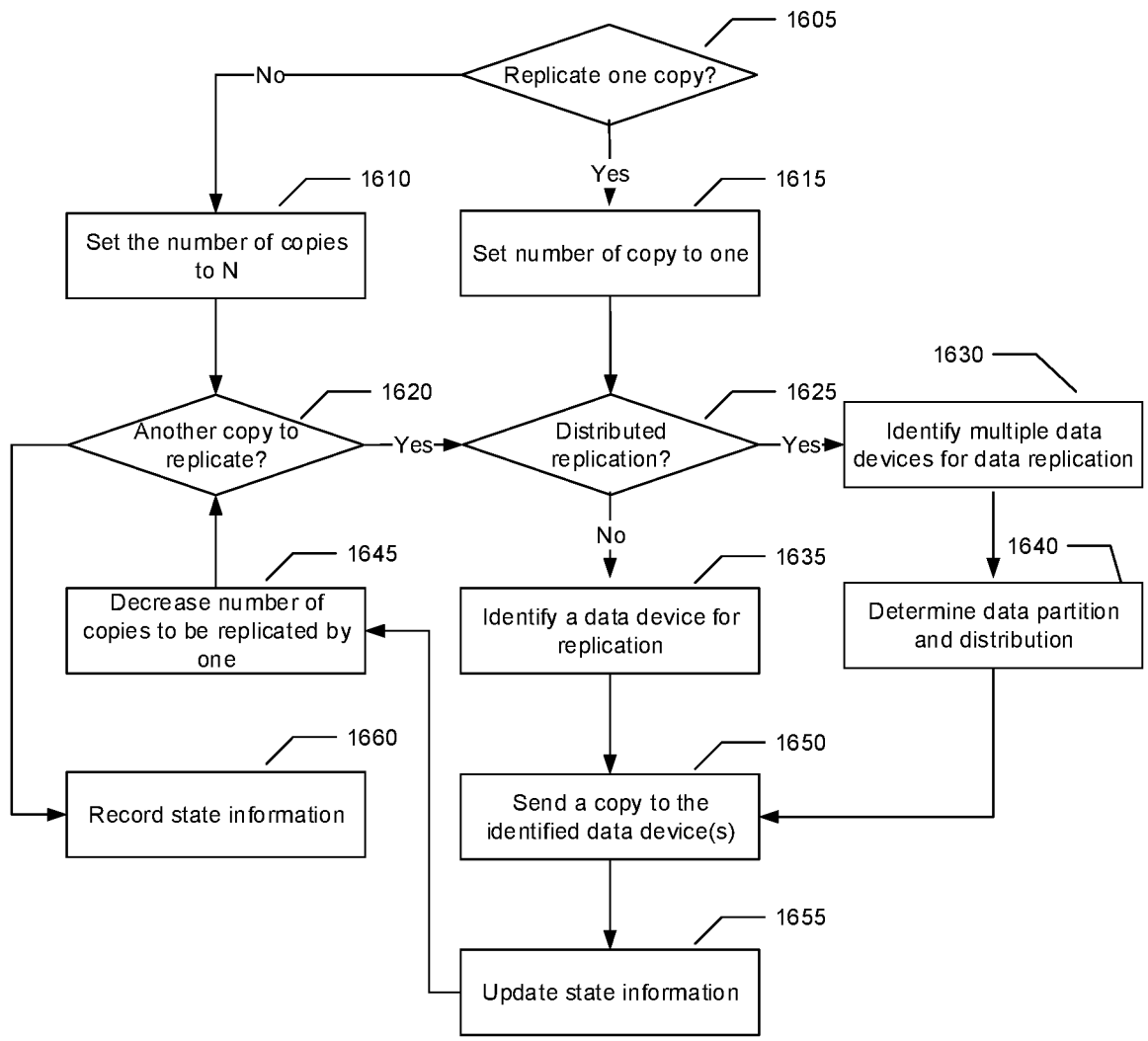
FIG. 16 is a flowchart of an exemplary process, in which data synchronized can be replicated in different modes, according to some embodiments.

FIG. 16 is a flowchart of an exemplary process of synchronizing content through replication, according to some embodiments. In this example, it may be determined, at 1605, whether one or more copies of the same content needs to be replicated. If only one copy is to be replicated, the number of copies to be replicated may be set, at 1615, to one. Otherwise, it may be set to N at 1610, where N is the number of copies desired. If there is only one copy to be replicated, the process may proceed to 1625 to determine the manner in which the content is to be replicated. If there is more than one copy to be replicated, each of the copies may be replicated individually, for example following the same process as for a single copy in the manner described below.

For each copy to be replicated, it may be further determined, at 1625, whether the current copy is to be replicated onto more than one data devices in a distributed manner. If the current copy is not to be replicated in a distributed manner, a single data device may be identified, at 1635, on which the current copy of the content is to be replicated. A copy of the content may then be sent, at 1650, to such identified data device to replicate the content. If the current copy is to be replicated in a distributed manner, more than one data device may be identified at 1630 and a distribution of different portions of the content may be determined at 1640. Different distribution schemes of the replicated portions of the content may be used. In some embodiments, content may be divided into different pieces according to some criterion. For instance, content may be divided according to some existing boundaries contained in the content itself (e.g. a news program may be divided according to commercials, or a movie may be divided according to scenes, or a music album may be divided according to tracks). Alternatively, content may be divided into blocks of equal size, each of which may be replicated on a single data device. One or more such blocks may be replicated on a data device. In a different embodiment, content may be divided into blocks of different sizes, for example of sizes determined according to the available storage capacity of data devices where those blocks are to be replicated. Once a distribution map is determined, portions of the content may be sent, at 1650, to their corresponding data devices.

When the data is replicated on other data device(s), state information related to the replication (synchronization) status may be optionally updated at 1655. The number of copies remaining to be replicated may then be decreased by one at 1645. If there is at least one copy remaining to be replicated, determined at 1620, the replication process for a current copy between 1625 and 61745 as described above may be repeated. If all desired replication is completed, the state information describing the performed replication may be optionally recorded at 1660.

In some embodiments, a plurality of copies of the same content may be replicated on a same data device. For example, each data device may be requested to replicate two copies of a same piece of content. In this case, the replication process described above may be accordingly broadened without changing the basic aspects of the algorithm.

Figure 17:
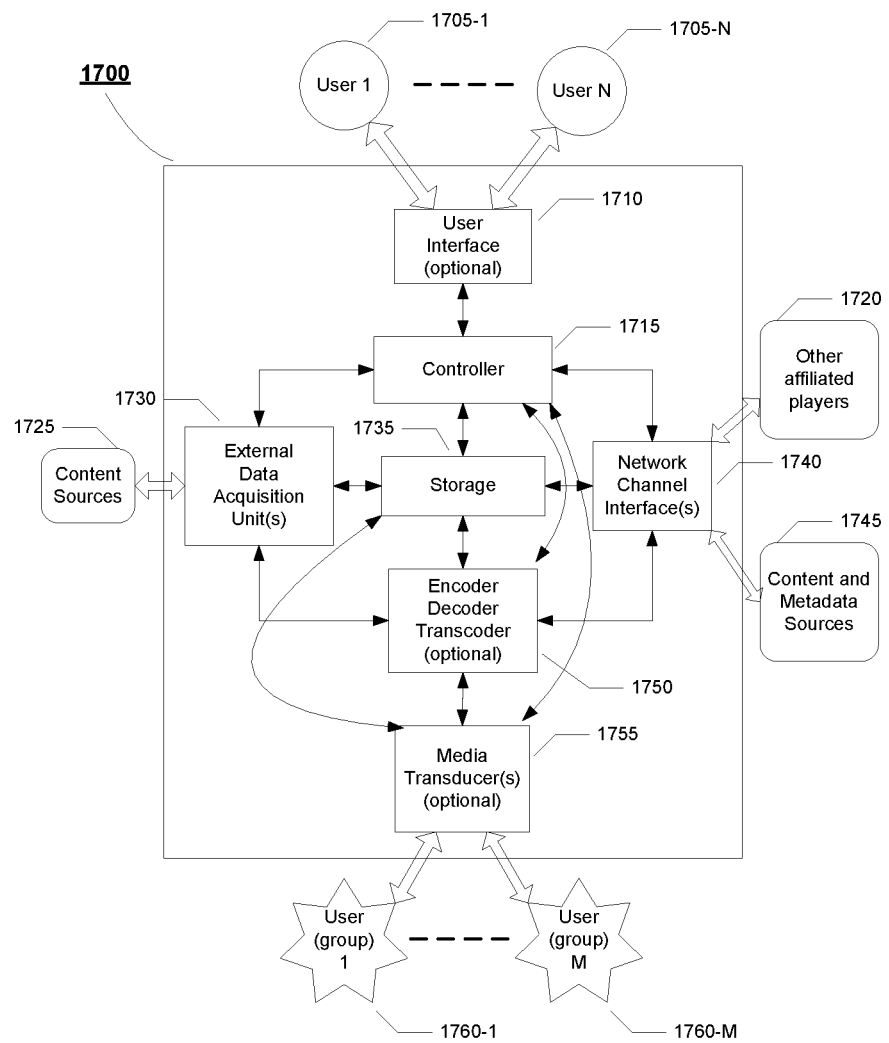
FIG. 17 depicts an exemplary high level block diagram of a data device capable of automated synchronization, according to some embodiments.

FIG. 17 depicts an exemplary high-level block diagram of a data device capable of automated synchronization, according to some embodiments. In this example, a generic data device 1700 capable of performing synchronization as described herein comprises a controller 1715, a data storage 1735, zero or more external data acquisition units (EDAU) 1730, and one or more network channel interfaces 1740. The controller 1715 may coordinate other components in the data device 1700 and perform different computations to carry out tasks related to synchronization. Storage 1735 may act as a repository for all data, including content, metadata, and state information of the data device 1700 and may optionally be used to store instructions for the controller 1715. Each EDAU 1730 may be used to acquire data that originated from other sources such as a content source 1725. Examples of an EDAU include a tuner, a video camera, a microphone, a VCR, a DVD player, etc. Each of the network channel interface(s) 1740 may act as a conduit to connect to external networks, which may link to one or more external data devices such as other affiliated player(s) 1720 or other content and metadata sources 1745. Examples of a network channel interface include an interface for Ethernet, DSL, cable modem, 802.11, Bluetooth, WiMax, etc.

The data device 1700 may optionally include a User Interface (UI) 1710, an encoder/decoder/transcoder (EDT) 1750, and one or more media transducers 1755. The UI 1710 may be employed in a data player such as a player on a laptop, on a personal computer, on a Personal Data Assistant (PDA), on a pocket player, or on a data player in a motor vehicle. The UI 1710 may not be deployed on a data device that serves as a base data device or as a server data device. The UI 1710 may be used to allow N external users 1705-1, . . . , 1705-N to interact with the controller 1715 and/or to manipulate the operation of the data device 1700. The EDT 1750 may be used to perform data transcoding, including encoding and decoding. A coder may be deployed in a data player that handles content processing between storage and retrieval. A coder may be used in a data player on, for example, a laptop, a personal computer, a PDA, or in a car. Such players may also include a decoder or a transcoder. The former may be used to drive a media transducer such as a television or stereo. The latter may be used to facilitate interoperability between various content formats of certain data devices such as a camcorder.

The media transducers 1755 facilitate media transformation to produce data in some desired media form. The media transducers 1755 may transform data in one media from one of M different user groups 1760-1, . . . , 1760-M to data in one or more other different media. For example, a motion picture data stream encoded in MPEG-2 may be separated into different media streams such as an audio stream (e.g. to be fed to a speaker), a video stream (e.g. to be fed to a TV monitor to render pictures), and a text stream (e.g. to be fed to an intercepting device to acquire closed captions). The controller 1715 may manipulate the media transducers 1755 to perform certain data processing. In some cases, the media transducer 1755 may also directly process data from the storage 1735. The media transducer 1755 may process data that has either been encoded/decoded or independently provided, for example from storage.

The network interfaces 1740 may be under the control of the controller 1715 and pass information either to and from the storage 1735 or to and from the EDT 1750. Each EDAU 1730 may operate under direction of the controller 1715 and direct data to and from the storage 1735 and the EDT 1750. In some embodiments, each EDAU 1730 may provide separate interfaces and controls for interfacing external content sources such as a camcorder, a digital camera, a CD reader/writer, or a DVD player. Each EDAU 1730 may optionally provide selection and/or tuner capabilities to facilitate selection of content received from, for example, broadcast, cable, or a disc jukebox. Each EDAU 1730 may also include one or more tuners used to accomplish such selections. An EDAU 1730 may also provide an interface for controlling an external tuner such as a cable box or a satellite decoder box. External tuner control may be exercised directly or through some simulation to emulate a tuner's remote control (e.g. infrared emitters, etc.).

An EDAU 1730 may be configured to be able to receive or retrieve metadata that arrives with content. Such metadata includes identifying information, table of contents (which may identify loaded CDs or DVDs), or closed captions accompanying television broadcasts. An EDAU 1730 may also be optionally configured to include certain control capabilities with respect to the content sources 1725 such as disk changer controls, control interfaces related to video-on-demand services, or broadcast channel selection.

Figure 18:
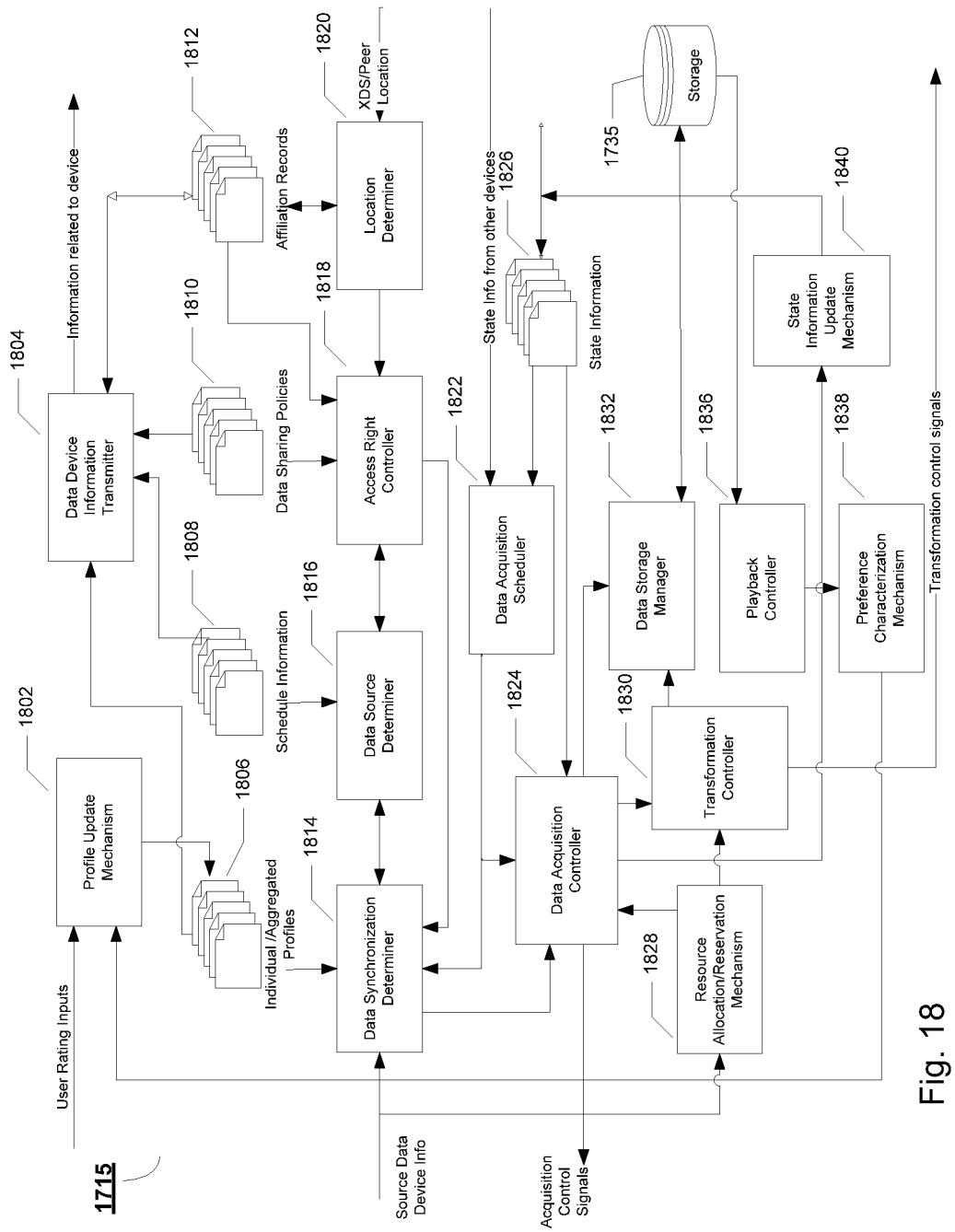
FIG. 18 depicts an exemplary high level block diagram for control of a data device, according to some embodiments.

FIG. 18 depicts an exemplary high level block diagram of the controller 1715, according to some embodiments. In this example, as depicted in FIG. 17, the controller 1715 may control operations of various components of the data device 1700. To facilitate various functionalities related to synchronization as described herein, the controller 1715, as illustrated in the exemplary embodiment in FIG. 18, may comprise some or all of: a data synchronization determiner 1814, a data acquisition scheduler 1822, a data acquisition controller 1824, a transformation controller 1830, a data storage manager 1832, a resource allocation/reservation mechanism 1828, a state monitoring mechanism 1840, a profile update mechanism 1802, and a data device information transmitter 1804. The controller 1715 may optionally include a data source determiner 1816, a data access right controller 1818, a location determiner 1820, a playback controller 1836, and a playback monitoring mechanism 1838. The controller 1715 may also optionally include different control information storages such as storages for one or more profiles 1806 (for individual or aggregated groups), schedule information 1808, data sharing policies 1810, affiliation records 1812, and state information 1826. In some embodiments, some or all subcomponents of the controller 1715 may be hardware components. In some embodiments, some or all subcomponents of the controller 1715 may be software components stored in a memory accessible to a processor capable of executing instructions from the memory. The exemplary functionality of each of the subcomponents within the controller 1715 is described below.

The data synchronization determiner 1814 is for making decisions related to desired data to be synchronized. It may reach such a decision by, for example, matching preference information (e.g. a preference list) retrieved from the profiles 1806 with information from one or more source data devices. Details related to such matching-based decision making are discussed with reference to FIGS. 5, 6, and 9. Optionally, the data synchronization determiner 1814 may also make such decisions based on information regarding availability of source devices, which is determined by the data determiner 1816 according to, for example, schedule related data 1808 (e.g. which source data devices have access to what data sources and within what time frames). The data synchronization determiner 1814 may also optionally impose certain data access right control in determining what data is to be acquired based on access control information (e.g. parental control) received from the access right controller 1818, wherein the access right control may be derived based on data sharing policies 1810, affiliation types (from the affiliation records 1812), or locality information from the location determiner 1820. The data synchronization determiner 1814 may also optionally rely on information (e.g. the starting point) from the data acquisition scheduler 1822 as to precisely what data is to be acquired (e.g. in opportunistic acquisition mode, each acquisition session may start from a different location) to refine its data synchronization decision. Information from the data acquisition scheduler 1822 may include the acquisition status with respect to data that is to be acquired from each source data device, determined based on either the state information 1826 about the data device 1700 or state information from the source data devices.

When the decision related to what data is to be synchronized is determined (by the data synchronization determiner 1814), the data acquisition controller 1824 may be activated to effectuate the acquisition. To achieve data acquisition, the data acquisition controller 1824 may either invoke the resource allocation/reservation mechanism 1828 to perform resource allocation/reservation (as discussed with reference to FIG. 12) or examine (e.g. during an intermediate acquisition session in opportunistic acquisition) a resource reservation record previously established by the resource allocation/reservation mechanism 1828 in order to identify the resource(s) required to acquire the desired data. The data acquisition controller 1824 may also utilize information from, for example, the data acquisition scheduler 1822 or the state information 1826 to generate specific acquisition control signals (to be sent to the EDAU 1730). Optionally, the data acquisition controller 1824 may also activate, when appropriate, the transformation controller 1830 to generate transformation control signals to be sent to either the EDT 1750 or the media transducers 1755 so that appropriate transformations on the desired data acquired from source data devices may be applied to obtain synchronized data in its desired form. Upon being activated, the transformation controller 1830 may generate the transformation control signals and send such signals to appropriate components. The data acquisition controller 1824 may also send controller signals to the data storage manager 1832, which controls the storage 1735.

The playback controller 1836 controls data playback on the data device 1700. The playback controller 1836 may be activated by a user (e.g. user 1 1805-1), for example, when the user presses a play button located on the UI 1710. Once activated, the playback controller 1836 may send signals to a player (not shown) to control data playback. Optionally, the playback controller 1836 may also activate the preference characterization mechanism 1838, which may monitor a user's viewing habits and then, based on such observation, automatically characterize the user's preference. For example, if a user watches a particular program more often than others without interruption, it may characterize that the user prefer content of similar types. Such automatically derived preference characterization may be sent to the profile update mechanism 1802 which may then update the corresponding preference information associated with the individual user. The profile update mechanism 1802 may also accept ratings entered by a user and use such manual entered rating information to update corresponding preference information associated with the user. This is discussed in detail with reference to FIG. 5.

The data acquisition controller 1824 may also invoke the state information update mechanism 1840 to monitor the data acquisition and dynamically update the state information. For example, during opportunistic acquisition via intermittent network connections, the acquisition status may be closely monitored and the state information indicating how much of the desired data has been acquired may be regularly updated based on such monitoring results. Related details are described with reference to FIG. 15. The data device 1700 may also send out information related to its own state via the data device information transmitter 1804. Such information may comprise a profile 1806 (either individual or aggregated), schedule information 1808 indicating what data sources the data device 1700 has access to (e.g. which channel of the broadcast with respect to locality), data sharing policies 1810, its affiliates 1812, and/or state information 1826.

Figure 19:
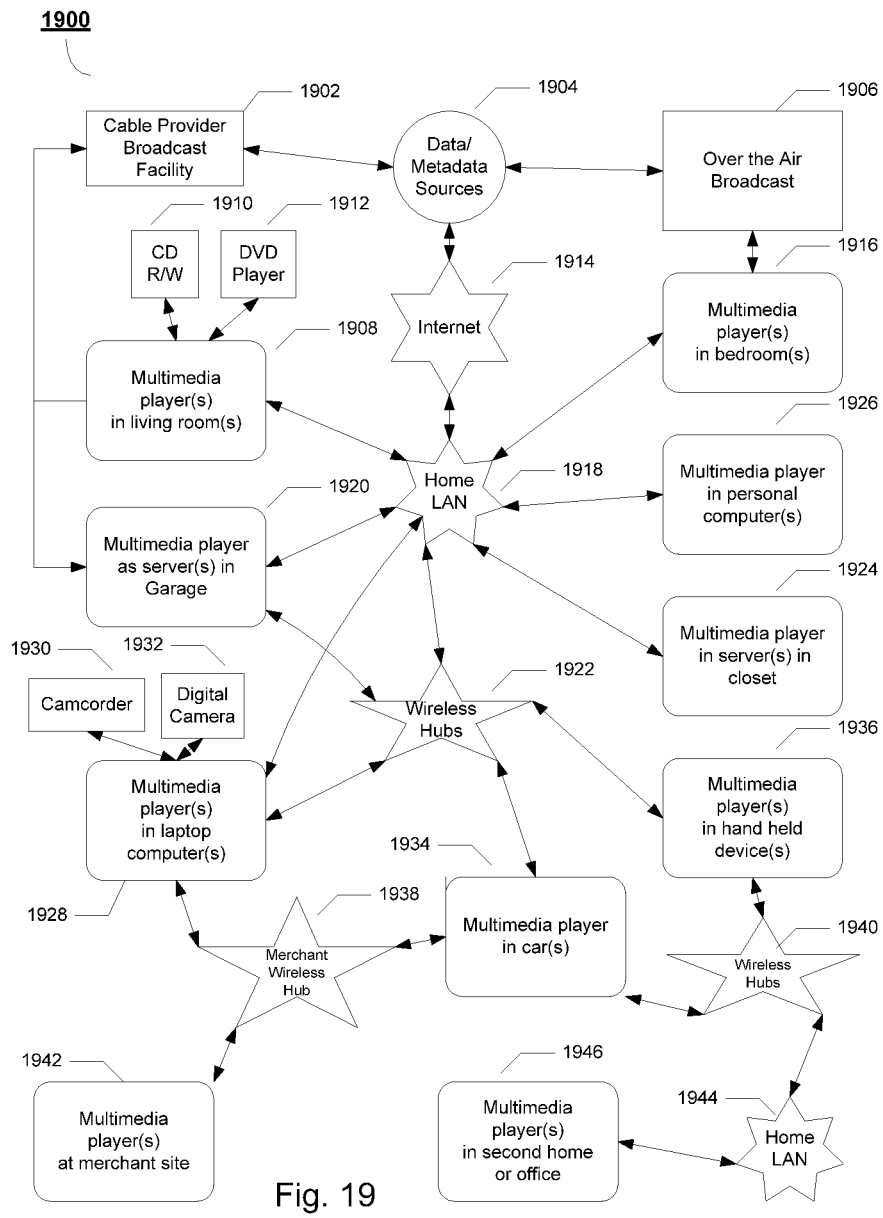
FIG. 19 depicts a construct of an exemplary application of synchronizing data devices in a home environment, according to some embodiments.

FIG. 19 depicts an exemplary construct of an application of synchronizing data devices, according to some embodiments. The application construct 1900 illustrates synchronization in, for example, a general home setting. The exemplary construct 1900 comprises a plurality of data devices in the form of, for example, multimedia players that may interconnect with each other via networks of possibly different types to synchronize data. In the illustrated application in a home setting, different multimedia players may be configured to operate on different types of devices (e.g. on a server, on a laptop computer, or on a hand held device), in different internal environments (e.g. in a bedroom, in a living room, or in a motor vehicle), or for different functional roles (e.g. some may serve as server(s)). For example, the construct 1900 includes multimedia player(s) in living room(s) 1908, in bedroom(s) 1916, in closet(s) 1924, in garage(s) 1920, in motor vehicle(s) 1934, in additional home(s) (e.g. a second home) 1946, on personal computer(s) 1926, on laptop(s) 1928, and/or on hand held device(s) 1936. The exemplary construct 1900 may also optionally include player(s) at one or more merchant locations (1942) which may interface with a player used at home so that the home player may synchronize with the merchant player(s) to acquire desired data/content.

Each of the players as illustrated may be configured differently depending on considerations including the specific environment where it is operating, the type of devices on which the player resides, the needs of the player's user, and/or the classification of the user (e.g. a child). For example, the multimedia player in a living room (1908) may have a configuration that permits the player to interface with different content sources, such as a CD R/W 1910, a DVD Player 1912, and/or a cable provider broadcast facility 1902, to interface with storage device such as the CD R/W 1910 to save content, and/or to interface with a home LAN 1918 to connect to other players. A bedroom player 1916 may be configured so that it is capable of receiving broadcast content transmitted over the air 1906. Some players may be configured to connect to wired networks only (e.g. players 1908, 1926 and 1924 are connected to the home LAN 1918 or a cable network). Some may be configured to communicate only through wireless connections (e.g. players 1934 and 1936). Some may be configured to be operable in different types of networks (e.g. players 1928 and 1916 are operable in both LAN and wireless networks and player 1920 is operable in both LAN and cable networks).

Multimedia player(s) as server(s) may be configured differently not only from non-server players but also among themselves. For instance, the player (as a server) in a garage 1920 may be configured so that it is able to acquire data directly from a content source located outside of the household, e.g. the cable provider broadcast facility 1902, and also capable of synchronizing with acquired data within other players within the household through, e.g. the home LAN 1918. But the player 1924 as a server in a closet may be configured as an internal server that cannot acquire content directly from an outside content source such as the cable provider 1902 (however, the server player in the closet may indirectly acquire content from outside through the home LAN 1918).

Other non-server players may also be configured differently from each other. For instance, a player on a laptop (1928) may be configured so that it is capable of connecting to different electronic devices as content sources such as a camcorder 1930 or a digital camera 1932. A player within a motor vehicle (e.g. which may be installed within the vehicle or may be a portable player that is brought into the vehicle) may be configured to be able to interface with a merchant wireless network hub 1938 and connect to the merchant player(s) 1942 to synchronize data. For example, a user may drive to a video store with a player inside of the car and acquire certain desired content from the players of the video store based on the synchronization scheme described herein. As another example, a user (or customer) may bring a portable data device or a player to a store (e.g. a video rental store or a music store) and connect the portable player with a device in the store 1942 to, for example, select content available at the store and synchronize such selected content. An example of connecting the portable device is to allow the portable device to automatically connect via a wireless network such as an 802.11 network. In some embodiments, a credential such as a membership number may be provided to connect, or to automatically connect. In some embodiments, preferences on the portable player may be used to determine available content that is potentially interesting. For example, a server in a video rental store may match preferences against available content and return matches as potentially interesting content. In some embodiments, promotional materials such as trailers may be provided for potentially interesting content. In some embodiments, potentially interesting content may be selectable through a user interface such as a menu. In some embodiments, a user may approve a transaction to rent content, for example explicitly through a user interface such as a dialog box or implicitly through a configuration policy that enables automatic approval. In some embodiments, a financial transaction such as a credit card transaction, a micropayment transaction or an account debit may be performed. A device in the store that synchronizes data with a customer's player may include different types of devices, such as a data storage server, a content server, a web server, a transport device, or a portable device. In some embodiments, a player of a first customer may synchronize data with another player of a second customer in the same store.

Synchronized content from a store may be either consumed directly on the portable player or subsequently synchronized with other data devices. For example, when a user drives home with desired content synchronized on a player in the car, such content may be synchronized with one or more other players in the household through a wireless hub in the house 1922 so that the acquired content may be replicated to those other players. For instance, the newly acquired content from the video store may be replicated in the player in the living room 1908. This may be achieved using different means. For example, the server player in the garage 1920 may first replicate the acquired content through a wireless connection 1922 and then act as a transport to replicate the acquired content to other players in the house through the home LAN 1918.

In some embodiments, if a user drives a motor vehicle with a player having content acquired from the video store players to the user's second home, the players in the second home 1946 may synchronize data with the car player by replicating the acquired content through a wireless hub 1940 (that facilitates transmission between the car player and a player insider of the second home) and/or a home LAN in the second home 1944 (to allow replicating content by players in the second home that do not interface with the wireless hub there). The content synchronized with the video store player 1942 may contain certain access right control which may restrict the replication by limiting, for example, types of affiliates that are allowed to synchronize such content. The content from the video store may also be replicated onto the hand held player 1936 through a wireless connection, either at the principle residence (i.e., through the wireless connection 1922) or at the second home (i.e., through wireless connection 1940).

Content acquired by players in the household (e.g. the player in the living room 1908) may also be synchronized with the car player. For example, the player in the car may seek acquisition of some content from players residing within the house. Alternatively, this may also be achieved through replication. For instance, the player in the living room may initiate replication of content acquired from the cable provider 1902 into the car player 1934 and such initiative may be triggered by the personal computer in the house based on a vacation calendar entered by the house owner, e.g. replicate children's programs onto the car player so that the children can watch such program while the family drives on the road to the vacation site. As another example, the bedroom player 1916 may monitor broadcast information either from the airwave 1906 or from the cable 1902 (not shown) and may periodically record desirable content (e.g. a presidential debate), which may then be replicated in the car player prior to, for example, the user's regular departure time next morning for work. During such replication, the originally acquired content (e.g. in video form) may be transformed (e.g. into audio only) onto the car player so that the user can listen to the debate while driving to work.

The player on a laptop 1928 and the player in a hand held device 1936 may be used in the same way as a player in a car (they may be placed in the car so that they are effectively as mobile as a player installed in the car). They may either synchronize content from outside of the household (e.g. from a video store) or synchronize content from a player inside of the house. When a laptop player is brought into the house, it may connect to other electronic devices (e.g. camcorder 1930 and digital camera 1932) that can be either content sources or content consumption devices. In some embodiments, the laptop player 1928 serves as a transport device between other players and such connected electronic devices. For instance, the laptop player may acquire desired content from the camcorder 1930 or the digital camera 1932 and subsequently replicate such acquired content to other players (e.g. to a server player) via different network connections. In addition, the laptop player 1928 may also acquire content and then transmit/replicate such content in the camcorder 1930 for consumption.

When an Internet connection 1914 is present in the household, the players inside of the house may also be able to access and synchronize Internet content. For example, the Internet 1914 may be connected to the home LAN 1918 through which players in the household may acquire and synchronize Internet content. The source of the Internet content may be some general data/metadata sources 1904, which may also provide information to the cable provider 1902 and the over-the-air broadcaster 1906, which also serve as content sources to the players in the household.

The wireless hubs 1922 may be directly connected to the home LAN 1918 and may provide intermittent connection to one or more players (e.g. wireless network connectivity such as 802.11x or Bluetooth). Players connected to intermittent wireless connections may be configured to be able to operate in such environments. Such players may carry out data synchronization in an opportunistic fashion while connecting to a wireless network. Players connected to both LAN and wireless networks may be configured to be able to switch between different functional modes while operating in a particular network.

Figure 20A:
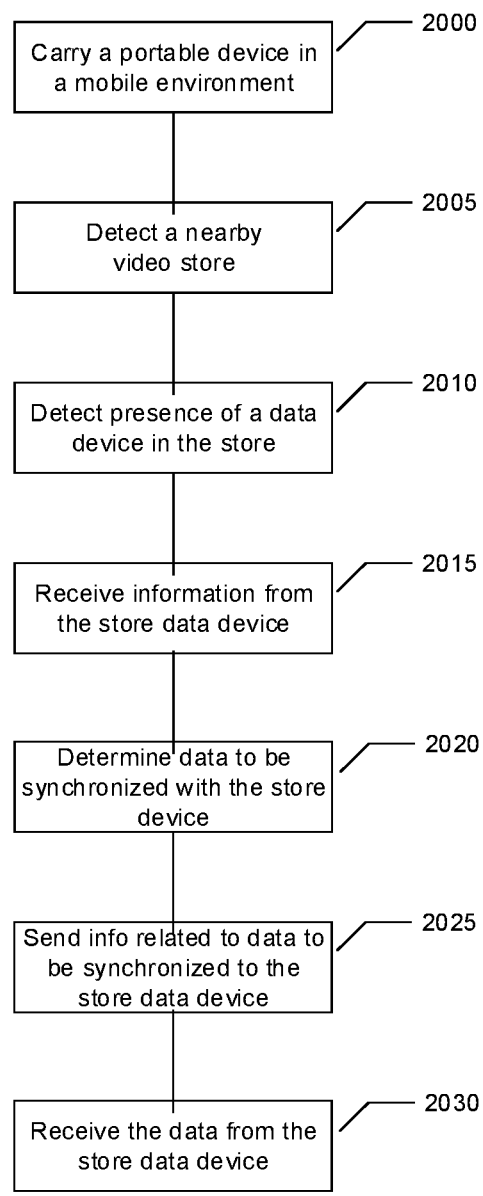
FIG. 20($a$) is a flowchart of an exemplary process, in which a data device synchronizes data with another data device in a video rental store, according to some embodiments.

FIG. 20(a) is a flowchart of an exemplary process, in which a data device synchronizes data with another data device in a video rental store, according to some embodiments. In this example, a customer may have a data device, at 2000, in a mobile environment. For example, a shopper may be walking in a shopping plaza, carrying a portable data device. As a second example, a customer in a motor vehicle may drive by a video rental store having a data device in the motor vehicle. A customer's data device may optionally automatically detect, at 2005, a nearby store. A store refers herein to any entity capable of selling or renting content. Examples of a store include a retail location of a video rental store or music store, or a server capable of electronically selling or renting multimedia content. Detection of a nearby store may be based on, for example, information received by the portable data device from local broadcast announcing nearby accessible commercial sites. In some embodiments, a video store may be detected by detecting a data device in the store. The portable data device may attempt to detect, at 2010, presence of a data device in the store. An example of detecting a data device in a store is to detect a wireless network such as an 802.11 network associated with the store.

When presence of such a data device is identified, the portable data device may receive, at 2015, information from the store data device. For example, a video rental store's data device may send information indicating all the new release movies available at the store. Alternatively, if a customer has rented movies from a video rental store in the past, the video rental store may retrieve past rental records of the customer, automatically generate an individualized list of preferred movies based on such rental history, and send the individualized list of preferred movies to the portable data device of the customer. In some embodiments, when a customer does not have a past rental record with a video rental store, a store data device may automatically provide a default list of recommended movies and send to a portable data device of the customer who is nearby. In some embodiments, a store data device may provide a customized list of recommended movies based on preferences associated with the portable data device. Based on such a list of available or recommended movies, a customer's portable data device may then determine, at 2020, movie(s) desired from the nearby video store and send, at 2025, information related to the movie(s) desired to a data device in the nearby video store. Upon receiving information related to movies desired, the customer's portable data device receives, at 2030, movie(s) desired from a data device in the store via synchronization. A customer data device may also communicate, for example, information needed to charge the customer for the rental (e.g., identity, credit card information, etc.) to a data device in the store to facilitate an automated charge to take place when the content is synchronized. In some embodiments, an affiliation between the customer's device and the store may be used as a basis of acquiring content. For example, an affiliated store may be permitted to supply content, such as trailers for available movies, via synchronization. As a second example, an affiliated customer device, such as one associated with a current account at the store, may be permitted by the store's data device to receive content via synchronization, and may for example automatically charge and/or annotate the customer's account after such a synchronization transfer.

Figure 20B:
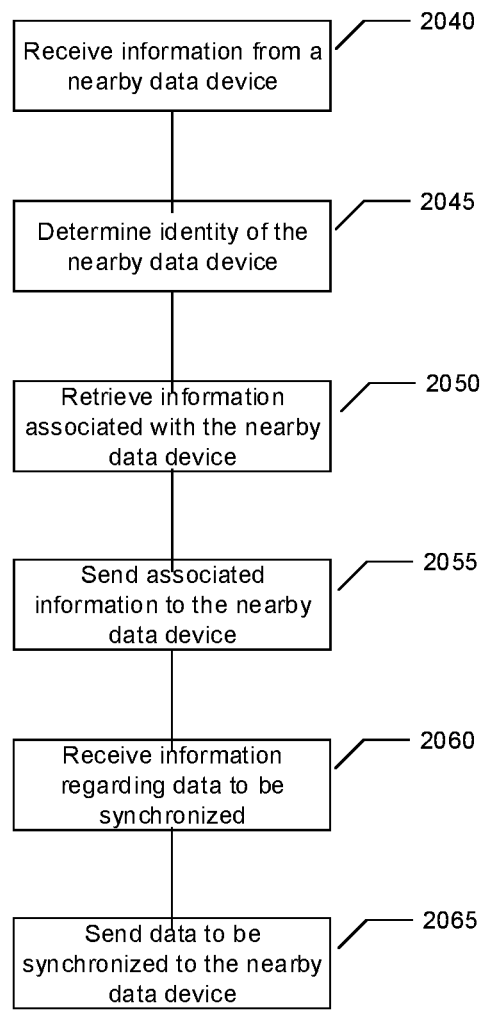

FIG. 20(b) is a flowchart of an exemplary process, in which a data device in a rental store synchronizes data with a data device near a video rental store, according to some embodiments. In this example, information from a nearby data device may be first received at 2040. In some embodiments, such nearby data device may be associated with some user(s) who may be an existing customer or a potential customer. The received information may be used to determine, at 2045, for example, an identity of a user of the data device. Information related to the identified user may be retrieved at 2050. Depending on the identity of the user, different types of information may be retrieved. For example, if the identified user is an existing customer with a past rental records, there may be an individualized profile about likings of the customer and a list of preferred movies that are available at the video rental store may be generated. As a second example with an existing customer, content that the customer has paid for or contracted for may be listed for potential synchronization, or supplied if the user's device elects to receive the content. In another example, preferences associated with the nearby data device may be used to generate recommended content, for example by matching against a list of available content. In some embodiments, when the identified user of the nearby data device is not a customer, a default list of available movies may be generated, which may correspond to, for example, a list of all new releases. Such retrieved information may then be sent, at 2055, to the nearby data device. When the store data device receives, at 2060, information about movie(s) desired, it may then send the desired movie(s) to the nearby data device automatically via synchronization. In some embodiments, the data device in the store may prevent or allow the requested content to be transferred, for example allowing movie trailers to be supplied to any recipient device, or for example restricting supply of complete movies to properly affiliated customer date devices.

Figure 21A:
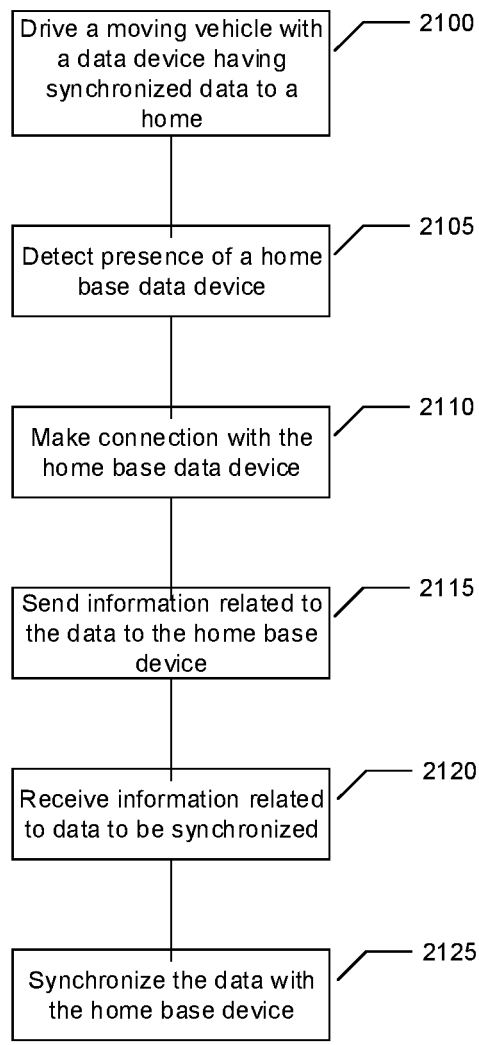
FIG. 21($a$) is a flowchart of an exemplary process, in which a data device in a motor vehicle synchronizes data with a home data device, according to some embodiments.

FIG. 21(a) is a flowchart of an exemplary process, in which a data device in a motor vehicle synchronizes data with a home data device, according to some embodiments. In this example, a motor vehicle with a data device therein may be approaching a home at 2100. Examples of a motor vehicle include a car, an SUV, a truck, and a motorcycle. A home may or may not be the home of a motor vehicle's owner. A data device in a motor vehicle may have data thereon. For example, a data device in a car may have one or more movies acquired from a video rental store via synchronization as described with reference to FIG. 20(a) and FIG. 20(b) above. While a motor vehicle is approaching or entering a home or parked nearby, a data device in the motor vehicle may automatically detect, at 2105, presence of a data device associated with the home, for example located inside of the home. In some embodiments, detection of the data device in the motor vehicle may be performed by the data device associated with the home. After detecting such presence, a connection may be established, at 2110, with the home data device. An example of a connection is a connection over a wireless network such as an 802.11 network.

Upon establishing a connection, the data device in the motor vehicle may synchronize with the home data device. An example of synchronizing with the home data device is to send, at 2115, information related to data stored thereon to the home data device. For instance, a data device in a motor vehicle may send information about movies stored thereon that are just acquired (or rented) from a video rental store. Such information may facilitate a home data device to determine whether to acquire such data from a data device in the motor vehicle. Alternatively, a motor vehicle data device may automatically acquire data from a home data device (not shown in FIG. 21(a)), such as home recordings of recently broadcast television shows. A home data device may send, at 2115, information about desired data, such as a movie supplied at a video store, to the motor vehicle data device. After receiving information about desired data such desired data may be synchronized at 2125. In some embodiments, data from the motor vehicle device may be replicated to the home data device, for example without processing information about desired data. In some embodiments, more than one data device in the home may synchronize data with a motor vehicle data device. In some embodiments, synchronization may be realized via acquisition (i.e., home data device acquires desired data from a data device in a motor vehicle). Alternatively, synchronization may be achieved via replication.

Figure 21B:
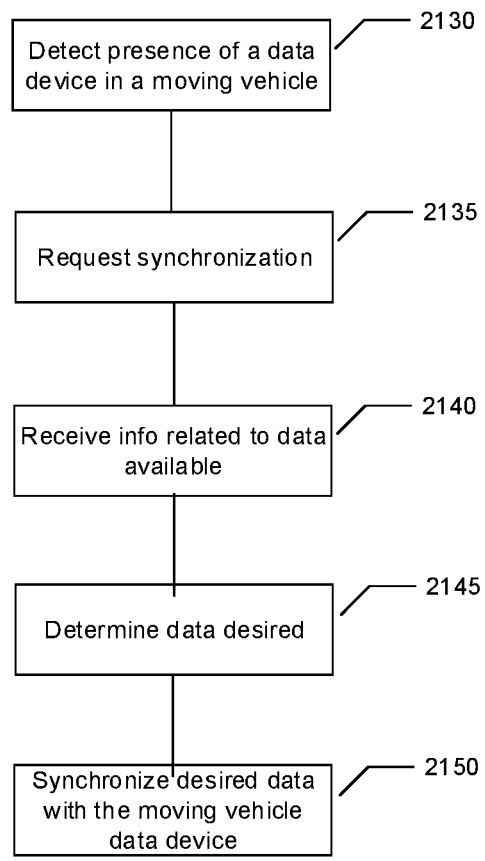

FIG. 21(b) is a flowchart of an exemplary process, in which a home data device synchronizes data with a data device in a motor vehicle near a home, according to some embodiments. In this example, a home data device detects, at 2130, presence of a data device in a vehicle. In some embodiments, the data device in the vehicle may detect the home data device. The home data device may then request, at 2135, to synchronize data with the data device in the vehicle. Alternatively, such a request may be received from the data device in the vehicle (not shown in FIG. 21(b)), for example a request for a list of available content, including for example newly recorded broadcast shows. Information related to data available for synchronization may be received, at 2140, from the data device in the vehicle. In some embodiments, information related to data available for synchronization may be received, at 2140, from the home data device. For example, a list of content including movies from a video store and/or metadata about those movies (e.g., frame rate, resolution, etc.) may be sent. It may then be determined, at 2145, data desired and such information may be sent from the device making the determination to the other device. Desired data may then be synchronized at 2150. Synchronizing desired data may include sending data from the motor vehicle data device to the home data device and/or from the home data device to the motor vehicle data device. In some embodiments, desired data may be synchronized between a data device in a vehicle and one or more home data devices via replication.

The above description related to the use of different aspects of synchronization is merely provided for illustration purposes. It does not and is not intended to limit the applicability of different techniques, either individually or in combination, to areas other than a home environment.

Although the foregoing invention has been described in some detail for purposes of clarity of understanding, it will be apparent that certain changes and modifications may be practiced. It should be noted that there are many alternative ways of implementing both the process and apparatus of the present invention. Accordingly, the present embodiments are to be considered as illustrative and not restrictive, and the invention is not to be limited to the details given herein, but may be modified.

What is claimed is:

1. A system, comprising:
   a first data device; and
   a second data device;
   wherein the first data device and the second data device are each configured to send and receive content;
   wherein the first data device and the second data device are configured to communicate with one another through a local area network;
   wherein the first data device is configured to record consumption state information indicating a consumption state corresponding to content consumption at the first data device;
   wherein the second data device is configured to:
      detect, via the local area network, that the first data device is accessible via the local area network; and
      automatically initiate, in response to detecting that the first data device is accessible via the local area network, synchronization of content consumption at the second data device with the content consumption at the first data device via direct communication with the first data device over the local area network and using the consumption state information recorded by the first data device;
   wherein the second data device is further configured to:
      determine a number of copies of a piece of content that are to be replicated to a plurality of data devices, wherein the number is two or more;
      identify each of the plurality of data devices to which the piece of content is to be replicated to;
      synchronously replicate respective copies of the piece of content to respective data devices of the plurality of data devices; and
      update state information relating to replication status based on the replicating of the respective copies of the piece of content to the respective data devices of the plurality of data devices.

2. The system according to claim 1, wherein the content consumption at the first data device corresponds to playback of multimedia content at the first data device; and
   wherein synchronizing the content consumption at the second data device with the content consumption at the first data device using the consumption state information further comprises: playing the multimedia content at the second data device from a starting point determined based on the consumption state information.

3. The system according to claim 1, wherein the first data device and the second data device are further configured to form an affiliation relationship based on a security policy, wherein the security policy provides for temporary affiliation between the first data device and the second data device based on identification information corresponding to an owner of the first data device and/or the second data device.

4. The system according to claim 1, wherein the first data device is further configured to send, to the second data device, multimedia content corresponding to the content consumption at the first data device.

5. The system according to claim 4, wherein the multimedia content sent to the second data device comprises at least one of audio, visual, textual, tactile or olfactory data.

6. The system according to claim 1, wherein the first data device is further configured to store a plurality of profiles, wherein the plurality of profiles comprises content preferences of a plurality of users.

7. The system according to claim 6, wherein the first data device is further configured to update the plurality of profiles.

8. The system according to claim 1, wherein the first data device is further configured to synchronize state information of the first data device with state information of the second data device at regular time intervals, wherein the state information of the first data device comprises the consumption state information.

9. The system according to claim 1, wherein the first data device is further configured to synchronize the content consumption at the first data device with the content consumption at the second data device using consumption state information recorded by the second data device.

10. The system according to claim 9, wherein the second data device is further configured to synchronize state information of the second data device with state information of the first data device at regular time intervals, wherein the state information of the second data device comprises the consumption state information of the second data device.

11. The system according to claim 1, wherein the first data device is configured to update state information of the first data device based on a trigger condition being met, wherein the state information of the first data device comprises the consumption state information.

12. The system according to claim 1, wherein detecting that the first data device is accessible via the local area network is based on the first data device announcing, using at least one of address information or locality information, that the first data device is accessible via the local area network.

13. The system according to claim 1, wherein detecting that the first data device is accessible via the local area network is based on the second data device polling for other data devices.

14. The system according to claim 1, wherein the local area network comprises a wireless local area network or a Bluetooth connection.

15. The system according to claim 1, wherein the second data device is further configured to:
determine that the number of copies of the piece of content that are to be replicated is to be decreased by one; and
record updated state information after decreasing the number of copies of the piece of content that are to be replicated.

16. A second data device, comprising:
a non-transitory memory having processor-executable instructions stored thereon; and
a processor, configured to execute the processor-executable instructions to facilitate:
detecting, via a local area network, that a first data device is accessible via the local area network, wherein the first data device and the second data device are each configured to send and receive content, and wherein the first data device and the second data device are configured to communicate with one another through the local area network; and
automatically initiating, in response to detecting that the first data device is accessible via the local area network, synchronization of content consumption at the second data device with content consumption at the first data device via direct communication with the first data device over the local area network and using consumption state information recorded by the first data device, wherein the consumption state information indicates a consumption state corresponding to the content consumption at the first data device;
wherein the processor is further configured to execute the processor-executable instructions to facilitate:
determining a number of copies of a piece of content that are to be replicated to a plurality of data devices, wherein the number is two or more;
identifying each of the plurality of data devices to which the piece of content is to be replicated to;
synchronously replicating respective copies of the piece of content to respective data devices of the plurality of data devices; and
updating state information relating to replication status based on the replicating of the respective copies of the piece of content to the respective data devices of the plurality of data devices.

17. The second data device according to claim 16, wherein the content consumption at the first data device corresponds to playback of multimedia content at the first data device; and
wherein synchronizing the content consumption at the second data device with the content consumption at the first data device using the consumption state information further comprises: playing the multimedia content at the second data device from a starting point determined based on the consumption state information.

18. The second data device according to claim 16, wherein the processor is further configured to execute the processor-executable instructions to facilitate: forming an affiliation relationship with the first data device based on a security policy, wherein the security policy provides for temporary affiliation between the first data device and the second data device based on using identification information corresponding to an owner of at least one of the first data device or the second data device.

19. A non-transitory computer-readable memory having processor-executable instructions stored thereon, wherein the processor-executable instructions, when executed, facilitate:
detecting, by a second data device, via a local area network, that a first data device is accessible via the local area network, wherein the first data device and the second data device are each configured to send and receive content, and wherein the first data device and the second data device are configured to communicate with one another through the local area network; and
automatically initiating, in response to detecting that the first data device is accessible via the local area network, by the second data device, synchronization of content consumption at the second data device with content consumption at the first data device via direct communication with the first data device over the local area network and using consumption state information recorded by the first data device, wherein the consumption state information indicates a consumption state corresponding to the content consumption at the first data device;
wherein the processor-executable instructions, when executed, further facilitate:
determining, by the second data device, a number of copies of a piece of content that are to be replicated to a plurality of data devices, wherein the number is two or more;
identifying, by the second data device, each of the plurality of data devices to which the piece of content is to be replicated to;
synchronously replicating, by the second data device, respective copies of the piece of content to respective data devices of the plurality of data devices; and
updating, by the second data device, state information relating to replication status based on the replicating of the respective copies of the piece of content to the respective data devices of the plurality of data devices.

20. The non-transitory computer-readable memory according to claim 19, wherein the content consumption at the first data device corresponds to playback of multimedia content at the first data device; and wherein synchronizing the content consumption at the second data device with the content consumption at the first data device using the consumption state information comprises: playing the multimedia content at the second data device from a starting point determined based on the consumption state information.

\* \* \* \* \*